(12) United States Patent
Russell

(10) Patent No.: US 8,740,200 B2
(45) Date of Patent: *Jun. 3, 2014

(54) FLUID-ELASTOMERIC DAMPER ASSEMBLY INCLUDING INTERNAL PUMPING MECHANISM

(75) Inventor: Donald D. Russell, Fairview, PA (US)

(73) Assignee: LORD Corporation, Cary, NC (US)

( * ) Notice: Subject to any disclaimer, the term of this patent is extended or adjusted under 35 U.S.C. 154(b) by 430 days.

This patent is subject to a terminal disclaimer.

(21) Appl. No.: 11/837,892

(22) Filed: Aug. 13, 2007

(65) Prior Publication Data

US 2007/0273075 A1    Nov. 29, 2007

Related U.S. Application Data

(63) Continuation of application No. 11/061,066, filed on Feb. 18, 2005, now Pat. No. 7,270,321, which is a continuation-in-part of application No. 10/703,068, filed on Nov. 6, 2003, now Pat. No. 7,137,624, which is a continuation-in-part of application No. 10/288,868, filed on Nov. 6, 2002, now Pat. No. 6,758,466.

(51) Int. Cl.
*B60G 13/06* (2006.01)
*F16F 1/40* (2006.01)
*F16F 9/06* (2006.01)

(52) U.S. Cl.
USPC ...... 267/219; 267/294; 267/64.17; 267/141.1

(58) Field of Classification Search
USPC ......... 267/195, 217, 219, 292, 293, 294, 113, 267/118, 121, 124, 126, 127, 136, 140.11, 267/140.12, 140.3, 140.4, 141, 141.1, 267/64.11, 64.13, 64.15, 64.16, 64.17, 267/64.18, 64.19, 64.23, 64.25, 64.27; 248/562, 636; 416/140
See application file for complete search history.

(56) References Cited

U.S. PATENT DOCUMENTS 2,919,883 A    1/1960  Murphy
3,046,003 A    7/1962  Schultz
(Continued)

FOREIGN PATENT DOCUMENTS

EP    0537927    4/1993
EP    0629791    12/1994
(Continued)

OTHER PUBLICATIONS

PCT International Search Report for PCT International Patent Application No. PCT/US2006/006006.

(Continued)

*Primary Examiner* — Thomas J Williams
(74) *Attorney, Agent, or Firm* — Richard G. Miller

(57) ABSTRACT

A fluid-elastomeric damper assembly operable for damping relative motion between a first structure and a second structure including a housing structure grounded to the first structure and a plurality of elastomer seals coupled to the housing structure, the housing structure and the plurality of elastomer seals defining a fluid-elastomeric chamber operable for containing a fluid. The fluid-elastomeric damper assembly also including one or more piston structures disposed within the housing structure and the fluid-elastomeric chamber, the one or more piston structures grounded to the first structure and driven by the second structure, and the one or more piston structures each including a first fluid chamber and a second fluid chamber in communication via an orifice, the first substantially fluid-filled chamber and the second substantially fluid-filled chamber also in communication with the fluid-elastomeric chamber through a fluid backfiller. The relative motion is operable for pumping the fluid through the orifice.

37 Claims, 34 Drawing Sheets

(56) References Cited

U.S. PATENT DOCUMENTS

| | | |
|---|---|---|
| 4,203,708 A | 5/1980 | Rybicki |
| 4,236,607 A | 12/1980 | Halwes et al. |
| 4,342,446 A | 8/1982 | Eaton et al. |
| 4,580,945 A | 4/1986 | Miller |
| 4,641,808 A | 2/1987 | Flower |
| 4,712,777 A | 12/1987 | Miller |
| 4,733,758 A | 3/1988 | Duclos et al. |
| 4,742,999 A | 5/1988 | Flower |
| 4,778,343 A | 10/1988 | Hahn et al. |
| 4,811,919 A | 3/1989 | Jones |
| 5,029,823 A | 7/1991 | Hodgson et al. |
| 5,092,738 A | 3/1992 | Byrnes et al. |
| 5,174,552 A | 12/1992 | Hodgson et al. |
| 5,186,439 A * | 2/1993 | McDonagh et al. ....... 267/64.27 |
| 5,219,430 A | 6/1993 | Antoine |
| 5,266,005 A | 11/1993 | Aubry |
| 5,273,262 A | 12/1993 | Baldini et al. |
| 5,312,093 A | 5/1994 | Smith et al. |
| 5,374,039 A | 12/1994 | Schmidt et al. |
| 5,407,325 A | 4/1995 | Aubry |
| 5,413,320 A | 5/1995 | Herbst |
| 5,423,523 A | 6/1995 | Gossman et al. |
| 5,427,347 A | 6/1995 | Swanson et al. |
| 5,540,549 A | 7/1996 | McGuire |
| 5,762,295 A | 6/1998 | McGuire et al. |
| 5,947,457 A | 9/1999 | Swanson et al. |
| 5,957,440 A | 9/1999 | Jones et al. |
| 6,022,600 A | 2/2000 | Schmidt et al. |
| 6,032,936 A | 3/2000 | Redinger |
| 6,045,328 A | 4/2000 | Jones |
| 6,056,279 A | 5/2000 | Lee et al. |
| 6,092,795 A | 7/2000 | McGuire |
| 6,200,097 B1 | 3/2001 | Mouille |
| 6,361,031 B1 | 3/2002 | Shores et al. |
| 6,378,852 B1 | 4/2002 | Ticks et al. |
| 6,394,432 B1 | 5/2002 | Whiteford |
| 6,758,466 B2 * | 7/2004 | Russell ........................ 267/219 |
| 2001/0052664 A1 | 12/2001 | Saitoh |
| 2002/0060268 A1 | 5/2002 | Smith et al. |
| 2002/0128072 A1 | 9/2002 | Terpay et al. |
| 2004/0145102 A1 | 7/2004 | Russell et al. |
| 2005/0146087 A1 | 7/2005 | Russell |

FOREIGN PATENT DOCUMENTS

| | | |
|---|---|---|
| GB | 796023 | 6/1958 |
| WO | 2004043782 | 5/2004 |

OTHER PUBLICATIONS

Written Opinion of the International Searching Authority for PCT International Patent Application No. PCT/US2006/006006.

U.S. Appl. No. 11/549,774, filed Oct. 16, 2006.

Official action dated Mar. 17, 2009 in U.S. Appl. No. 11/549,774, pp. 1-11.

Official action dated Dec. 12, 2008 in U.S. Appl. No. 11/549,774, pp. 1-6.

Wallens, David S., "Shocking Behavior", Grassroots Motorsports, Sep. 2003.

* cited by examiner

FLUID-ELASTOMERIC DAMPER ASSEMBLY INCLUDING INTERNAL PUMPING MECHANISM

This application is a Continuation of U.S. patent application Ser. No. 11/061,066 filed Feb. 18, 2005, now U.S. Pat. No. 7,270,321 which is a Continuation-in-Part (CIP) of U.S. patent application Ser. No. 10/703,068 filed Nov. 6, 2003, now U.S. Pat. No. 7,137,624, which is a Continuation-in-Part (CIP) of U.S. patent application Ser. No. 10/288,868 filed Nov. 6, 2002, now U.S. Pat. No. 6,758,466 the priority to which are hereby claimed, and are hereby incorporated by reference.

FIELD OF THE INVENTION

The present invention relates generally to a damper assembly used to control movement/vibration in a mechanical system or the like. More specifically, the present invention relates to a fluid-elastomeric damper assembly including an internal pumping mechanism. The fluid-elastomeric damper assembly may be used, for example, to control movement/vibration in the lead-lag direction of the rotor of a rotary-wing aircraft or the like.

BACKGROUND OF THE INVENTION

Conventional fluid-elastomeric damper assemblies (also referred to as "Fluidlastic®" damper assemblies commercially available from LORD Corporation, 111 Lord Drive, PO BOX 8012, Cary, N.C. 27511) typically incorporate an elastomer seal, such as a rubber seal or the like, containing a fluid, such as hydraulic fluid or the like. This elastomer seal is bonded, fixedly attached, or otherwise coupled to the major metal components of the fluid-elastomeric damper assembly which are, in turn, fixedly attached or otherwise coupled to one or more moving/vibrating structures. These moving/vibrating structures may include, for example, the flex-beam and the pitch case of the rotor of a rotary-wing aircraft or the like. The elastomer seal is used to pump the fluid through a restriction, such as one or more orifices or the like, creating an increase in the fluid pressure which reacts against the elastomer seal surface, resulting in a damping force resisting the movement/vibration of the one or more moving/vibrating structures. The fluid may be pumped, for example, from one chamber disposed within the elastomer seal or an associated structure to another chamber disposed within the elastomer seal or an associated structure, or from one chamber formed by the major metal components of the fluid-elastomeric damper assembly to another chamber formed by the major metal components of the fluid-elastomeric damper assembly.

Advantageously, the elastomer seal is substantially leak-resistant and is capable of accommodating movement/vibration in a plurality of directions. However, in order to create a desired damping force, the volume stiffness, i.e., the elastomer stiffness reacting the fluid pressure, of the fluid-elastomeric damper assembly must be sufficiently high and the observed increase in the stiffness of the elastomer seal which results from the increased fluid pressure must be limited to within a predetermined range. This is not always possible, for example, in the control of movement/vibration in the lead-lag direction of the rotor of a rotary-wing aircraft or the like.

Thus, what is needed is a fluid-elastomeric damper assembly including one or more elastomer seals, but also including an internal pumping mechanism that does not rely on the one or more elastomer seals to pump the fluid through the restriction, i.e., through the one or more orifices. This would allow for the creation of relatively higher damping forces in relation to the elastomer stiffness for resisting relatively greater movement/vibration of the one or more moving/vibrating structures than is possible with conventional fluid-elastomeric damper assemblies. Although the assemblies, mechanisms, and methods of the present invention are described herein below in conjunction with the flex-beam and the pitch case of the rotor of a rotary-wing aircraft or the like, the assemblies, mechanisms, and methods of the present invention may be used in conjunction with any mechanical system or the like including one or more moving/vibrating structures that it is desirable to damp.

BRIEF SUMMARY OF THE INVENTION

In various embodiments of the present invention, a fluid-elastomeric damper assembly includes at least a first elastomer seal, such as a rubber seal or the like, disposed at a first end of the fluid-elastomeric damper assembly and a second elastomer seal, such as a rubber seal or the like, disposed at a second end of the fluid-elastomeric damper assembly. The first elastomer seal is fixedly attached or otherwise coupled to a first moving/vibrating structure, such as a flex-beam of the rotor of a rotary-wing aircraft or the like, and the second elastomer seal is fixedly attached or otherwise coupled to a second moving/vibrating structure, such as a pitch case of the rotor of a rotary-wing aircraft or the like. The first elastomer seal and the second elastomer seal are both bonded, fixedly attached, or otherwise coupled to a housing structure including, for example, a first housing member and a second housing member. Together, the first elastomer seal, the second elastomer seal, and the housing structure are operable for containing a fluid, such as hydraulic fluid or the like. An internal pumping mechanism including one or more piston structures and a piston structure housing is also disposed within the housing structure. The internal pumping mechanism is grounded to or integrally formed with the first moving/vibrating structure and moves in relation to the housing structure and the second moving/vibrating structure to which the housing structure is grounded. The internal pumping mechanism is configured such that, when the internal pumping mechanism moves with respect to the housing structure and the second moving/vibrating structure, the fluid surrounding and disposed within the internal pumping mechanism is pumped from a first chamber disposed within each of the one or more piston structures to a second chamber disposed within each of the one or more piston structures through a restriction, i.e., an orifice. Optionally, the relative size of the restriction is controlled by an adjustable pressure relief device and/or a temperature-compensating device. Advantageously, the first elastomer seal, the second elastomer seal, and the housing structure provide a fluid-elastomeric chamber operable for containing the fluid and in which the internal pumping mechanism may be submerged. This fluid-elastomeric chamber is flexible and allows the internal pumping mechanism to damp movement/vibration in a primary direction with a relatively high damping force. Additionally, movement/vibration in a plurality of other directions is accommodated by the internal pumping mechanism by design, without damping force.

In one embodiment of the present invention, a fluid-elastomeric damper assembly includes a housing structure, a first elastomer seal coupled to the housing structure, and a second elastomer seal coupled to the housing structure. The housing structure, the first elastomer seal, and the second elastomer seal define a fluid-elastomeric chamber operable for containing a fluid. The fluid-elastomeric damper assembly also includes an internal pumping mechanism disposed within the fluid-elastomeric chamber.

In another embodiment of the present invention, a fluid-elastomeric damper assembly operable for damping relative motion between a first structure and a second structure includes a housing structure coupled the first structure, a first elastomer seal coupled to the housing structure, wherein the first elastomer seal is also coupled to the second structure, and a second elastomer seal coupled to the housing structure. Again, the housing structure, the first elastomer seal, and the second elastomer seal define a fluid-elastomeric chamber operable for containing a fluid. The fluid-elastomeric damper assembly also includes an internal pumping mechanism disposed within the fluid-elastomeric chamber, wherein the internal pumping mechanism is coupled to the second elastomer seal.

In a further embodiment of the present invention, a fluid-elastomeric damper assembly operable for damping relative motion between a first structure and a second structure includes a housing structure grounded to the first structure and a plurality of elastomer seals coupled to the housing structure, wherein the housing structure and the plurality of elastomer seals define a fluid-elastomeric chamber operable for containing a fluid. The fluid-elastomeric damper assembly also includes one or more piston structures disposed within the housing structure and the fluid-elastomeric chamber, wherein the one or more piston structures are grounded to the first structure and driven by the second structure, and wherein the one or more piston structures each include a first substantially fluid-filled chamber and a second substantially-fluid-filled chamber in communication via an orifice, the first substantially fluid-filled chamber and the second substantially fluid-filled chamber also in communication with the fluid-elastomeric chamber. The housing structure is operable for pumping the fluid through the orifice.

In a still further embodiment of the present invention, a method for damping relative motion between a first structure and a second structure includes grounding a housing structure to the first structure, coupling a plurality of elastomer seals to the housing structure, wherein the housing structure and the plurality of elastomer seals define a fluid-elastomeric chamber, and disposing a fluid within the fluid-elastomeric chamber. The method also includes disposing one or more piston structures within the housing structure and the fluid-elastomeric chamber and grounding the one or more piston structures to the first structure, wherein the one or more piston structures each include a first substantially fluid-filled chamber and a second substantially-fluid-filled chamber in communication via an orifice, the first substantially fluid-filled chamber and the second substantially fluid-filled chamber also in communication with the fluid-elastomeric chamber. Again, the housing structure is operable for pushing the fluid through the orifice. The method further comprising driving the one or more piston structures with the second structure.

The invention includes a fluid-elastomeric damper assembly operable for damping a relative motion between a first structure and a second structure. The fluid-elastomeric damper assembly includes elastomeric seals coupled to a fluid-elastomeric chamber housing to define a fluid-elastomeric chamber operable for containing a damper fluid. The fluid-elastomeric damper assembly includes an internal pumping mechanism with at least one fluid moving piston disposed within the fluid-elastomeric chamber. Preferably the internal pumping mechanism is grounded to the first structure and driven by the second structure. The internal pumping mechanism at least one piston forces the damper fluid through at least one pumping piston restriction orifice between a first fluid variable volume chamber and a second fluid variable volume chamber. The first fluid variable volume chamber includes a first fluid backfiller, the first fluid backfiller providing fluid communication of the damper fluid from the fluid-elastomeric chamber into the first fluid chamber and inhibiting a flow of the fluid from the first fluid chamber into the fluid-elastomeric chamber. The second fluid chamber includes a second fluid backfiller, the second fluid backfiller providing fluid communication of the fluid from the fluid-elastomeric chamber into the second fluid chamber and inhibiting a flow of the fluid from the second fluid chamber into the fluid-elastomeric chamber. The relative motion between the first structure and the second structure is operable for pumping the fluid through the at least one restriction orifice.

The invention includes a method for damping a relative motion between a first structure and a second structure. The method includes grounding a housing to the first structure; coupling a plurality of elastomeric seals to the housing, wherein the housing and the plurality of elastomeric seals provide a fluid-elastomeric chamber for containing a damper fluid. The method includes disposing a damper fluid within the fluid-elastomeric chamber. The method includes disposing an internal fluid pump with at least one fluid moving piston within the fluid-elastomeric chamber, with the internal fluid pump comprising a first fluid variable volume chamber and a second fluid variable volume chamber in communication via at least one orifice. The first fluid chamber includes a first fluid backfiller and the second fluid chamber including a second fluid backfiller. The first fluid chamber and the second fluid chamber are in communication with the fluid-elastomeric chamber wherein the relative motion between the first structure and the second structure drives the at least one fluid moving piston to pump the fluid through the at least one orifice with the first fluid backfiller providing fluid communication of the fluid from the fluid-elastomeric chamber into the first fluid chamber and inhibiting a flow of the fluid from the first fluid chamber into the fluid-elastomeric chamber and the second fluid backfiller providing fluid communication of the fluid from the fluid-elastomeric chamber into the second fluid chamber and inhibiting a flow of the fluid from the second fluid chamber into the fluid-elastomeric chamber.

The invention includes a method of making a fluid-elastomeric damper assembly for damping a relative motion between a first structure and a second structure. The method includes coupling a plurality of elastomeric seals to a housing, wherein the housing and the plurality of elastomeric seals provide a fluid-elastomeric chamber for containing a damper fluid. The method includes disposing an internal fluid pump with at least one fluid moving piston within the fluid-elastomeric chamber wherein the internal fluid pump comprises a first fluid variable volume chamber and a second fluid variable volume chamber in communication via at least one orifice, and the first fluid filled chamber including a first fluid backfiller and the second fluid filled chamber including a second fluid backfiller. The method includes disposing a damper fluid within the fluid-elastomeric chamber, with the first fluid chamber and the second fluid chamber in communication with the fluid-elastomeric chamber, wherein the relative motion between the first structure and the second structure drives the at least one fluid moving piston to pump the fluid through the at least one orifice with the first fluid backfiller providing fluid communication of the fluid from the fluid-elastomeric chamber into the first fluid chamber and inhibiting a flow of the fluid from the first fluid chamber into the fluid-elastomeric chamber and the second fluid backfiller providing fluid communication of the fluid from the fluid-elastomeric chamber into the second fluid chamber and inhibiting a flow of the fluid from the second fluid chamber into the fluid-elastomeric chamber.

The invention includes a method for damping relative motion between a first structure and a second structure. The method includes grounding a housing structure to the first structure. The method includes coupling a plurality of elastomer seals to the housing structure, wherein the housing structure and the plurality of elastomer seals define a fluid-elastomeric chamber. The method includes disposing a piston within the housing structure and the fluid-elastomeric chamber, wherein the piston comprises a first variable volume chamber and a second variable volume chamber in communication via an orifice, the first fluid-filled chamber and the second fluid-filled chamber also in communication with the fluid-elastomeric chamber. The method includes disposing a damper fluid within the fluid-elastomeric chamber, wherein the relative motion between the first structure and the second structure is operable for driving the piston and pumping the fluid through the orifice, with the fluid outside the piston and contained in the fluid-elastomeric chamber having an operational ambient fluid pressure PA, and the fluid inside the piston having an operational dynamic fluid pressure PD when pumped by the piston with PD≥1.01PA.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE INVENTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Figure 1:
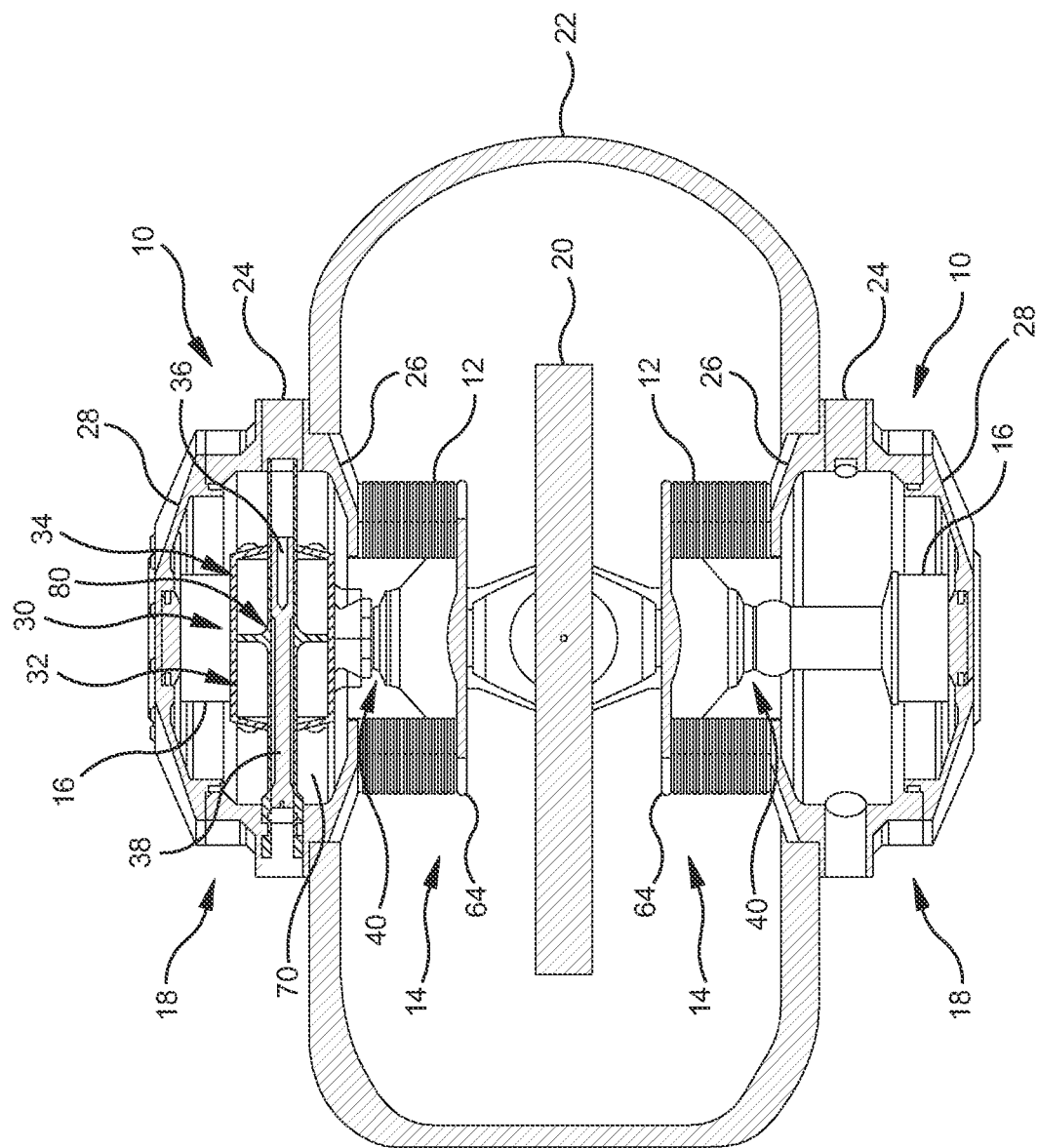
FIG. 1 is a cross-sectional side (cord-wise) view of one embodiment of the fluid-elastomeric damper assembly of the present invention, highlighting an internal pumping device disposed with a fluid-elastomeric chamber of the fluid-elastomeric damper assembly (the top portion of FIG. 1 illustrating the internal pumping device, the bottom portion of FIG. 1 illustrating the fluid-elastomeric chamber)
Figure 3:
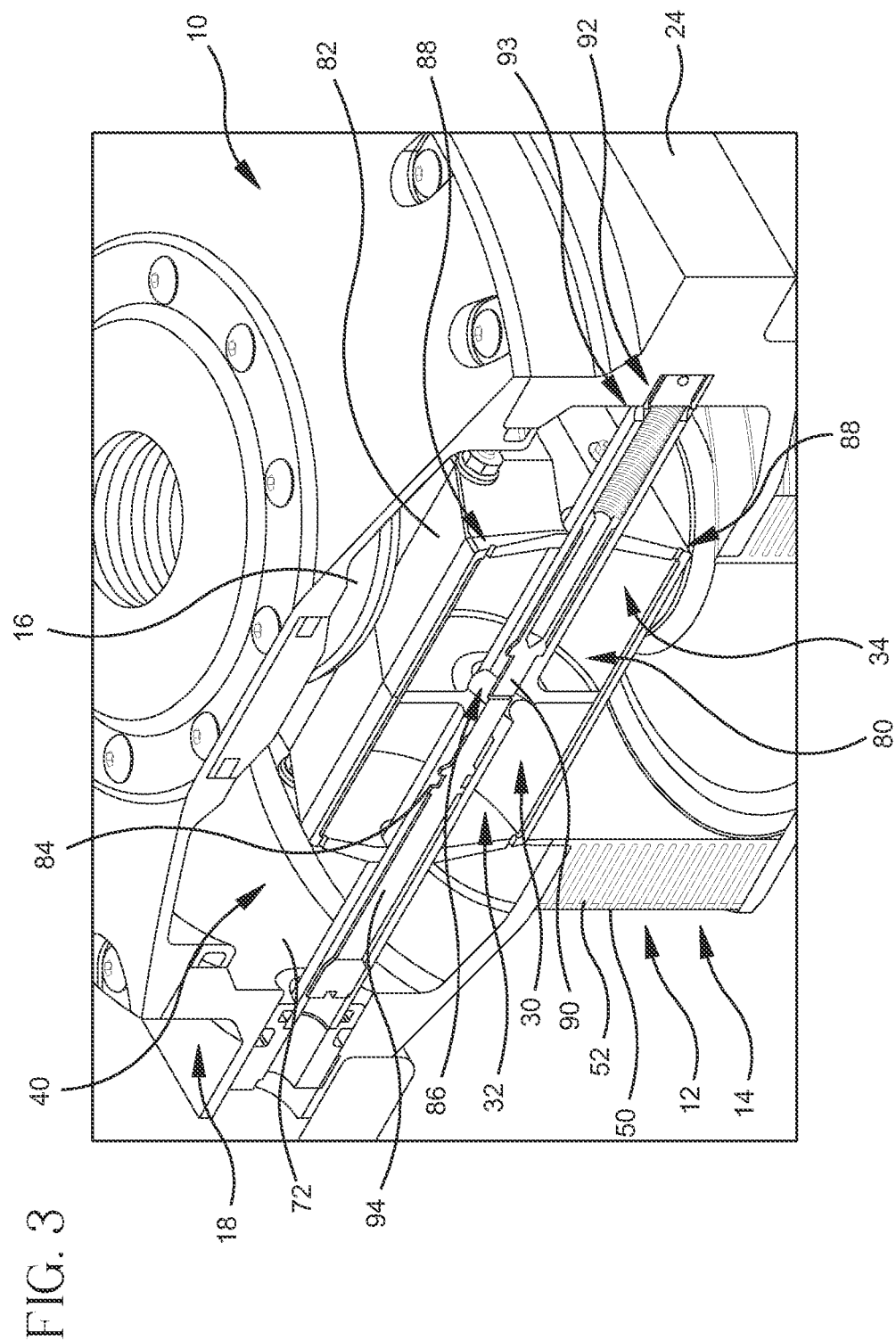
FIG. 3 is an exploded perspective view of the fluid-elastomeric damper assembly of FIGS. 1 and 2, again highlighting the internal pumping device disposed with the fluid-elastomeric chamber of the fluid-elastomeric damper assembly.
Figure 4:
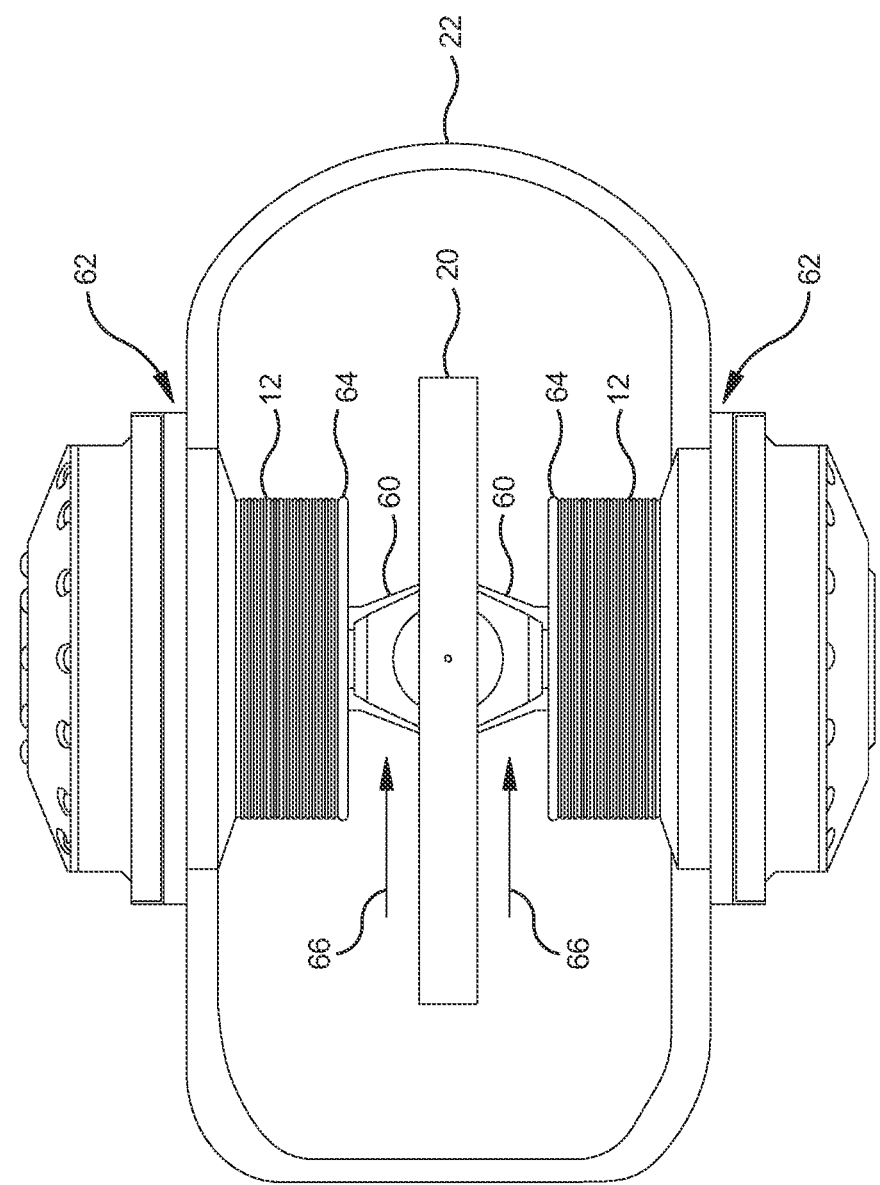
FIG. 4 is a side (cord-wise) view of the fluid-elastomeric damper assembly of FIGS. 1-3.

Reference will now be made in detail to the present preferred embodiments of the invention, examples of which are illustrated in the accompanying drawings. The invention includes a fluid-elastomeric damper assembly with a reciprocating piston structure grounded to a first structure and driven by a second structure with the piston structure submerged in a fluid and having a first fluid filled chamber and a second fluid filled chamber which communicate via a pump restriction orifice through which the piston forces the fluid through. The invention includes fluid-elastomeric damper assembly 10 includes a first elastomer seal 12, such as a rubber seal or the like, disposed at a first end 14 of the fluid-elastomeric damper assembly 10 and a second elastomer seal 16, such as a rubber seal or the like, disposed at a second end 18 of the fluid-elastomeric damper assembly 10. The first elastomer seal 12 and the second elastomer seal 16 are fixedly attached or otherwise coupled to a first moving/vibrating structure 20, such as a flex-beam of the rotor of a rotary-wing aircraft or the like, and the first elastomer seal 12 and the second elastomer seal 16 are fixedly attached or otherwise coupled to a second moving/vibrating structure 22, such as a pitch case of the rotor of a rotary-wing aircraft or the like. The first elastomer seal 12 and the second elastomer seal 16 are both bonded, fixedly attached, or otherwise coupled to a housing structure 24 including, for example, a first housing member 26, a second housing member 28, and a third housing member 70. The first elastomer seal 12 and the second elastomer seal 16 are also both bonded, fixedly attached, or otherwise coupled to a substantially circular base plate 64. Together, the first elastomer seal 12, the second elastomer seal 16, the housing structure 24, and the substantially circular base plate 64 are operable for containing a fluid, such as hydraulic fluid or the like. An internal pumping mechanism 30 is also disposed within the housing structure 24. The internal pumping mechanism 30 is grounded to the first moving/vibrating structure 20 and moves in relation to the housing structure 24 and the second moving/vibrating structure 22 to which the housing structure 24 is grounded. The internal pumping mechanism 30 is configured such that, when the internal pumping mechanism 30 moves with respect to the housing structure 24 and the second/moving vibrating structure 22, the fluid surrounding and disposed within the internal pumping mechanism 30 is pumped from at least a first variable volume chamber 32 disposed within the internal pumping mechanism 30 to at least a second variable volume chamber 34 disposed within the internal pumping mechanism 30 through a restriction, i.e., an orifice 86 (FIG. 3, 14A, 18). Optionally, the relative size of the restriction is controlled by an adjustable pressure relief device 36 and/or a temperature-compensating device 38 (both described in greater detail herein below). It should be noted that FIG. 1 illustrates an upper fluid-elastomeric damper assembly 10 (top portion of FIG. 1) including an internal pumping mechanism 30 and a lower fluid-elastomeric damper assembly 10 (bottom portion of FIG. 1) without an internal pumping mechanism 30. The lower-fluid-elastomeric damper 10 assembly may, optionally, include an internal pumping mechanism 30.

Figure 11:
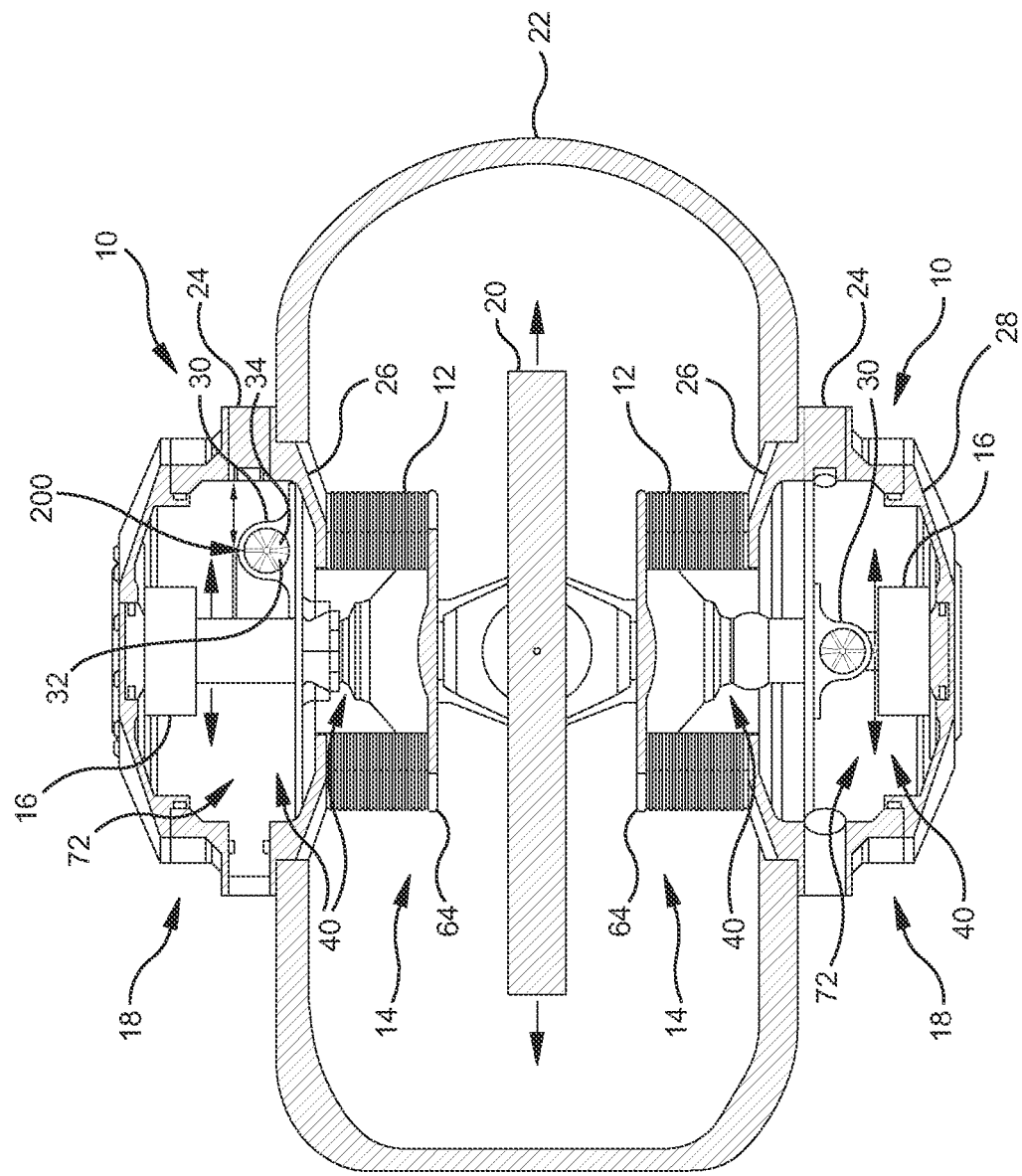
FIG. 11 shows an embodiment of the invention.
Figure 12:
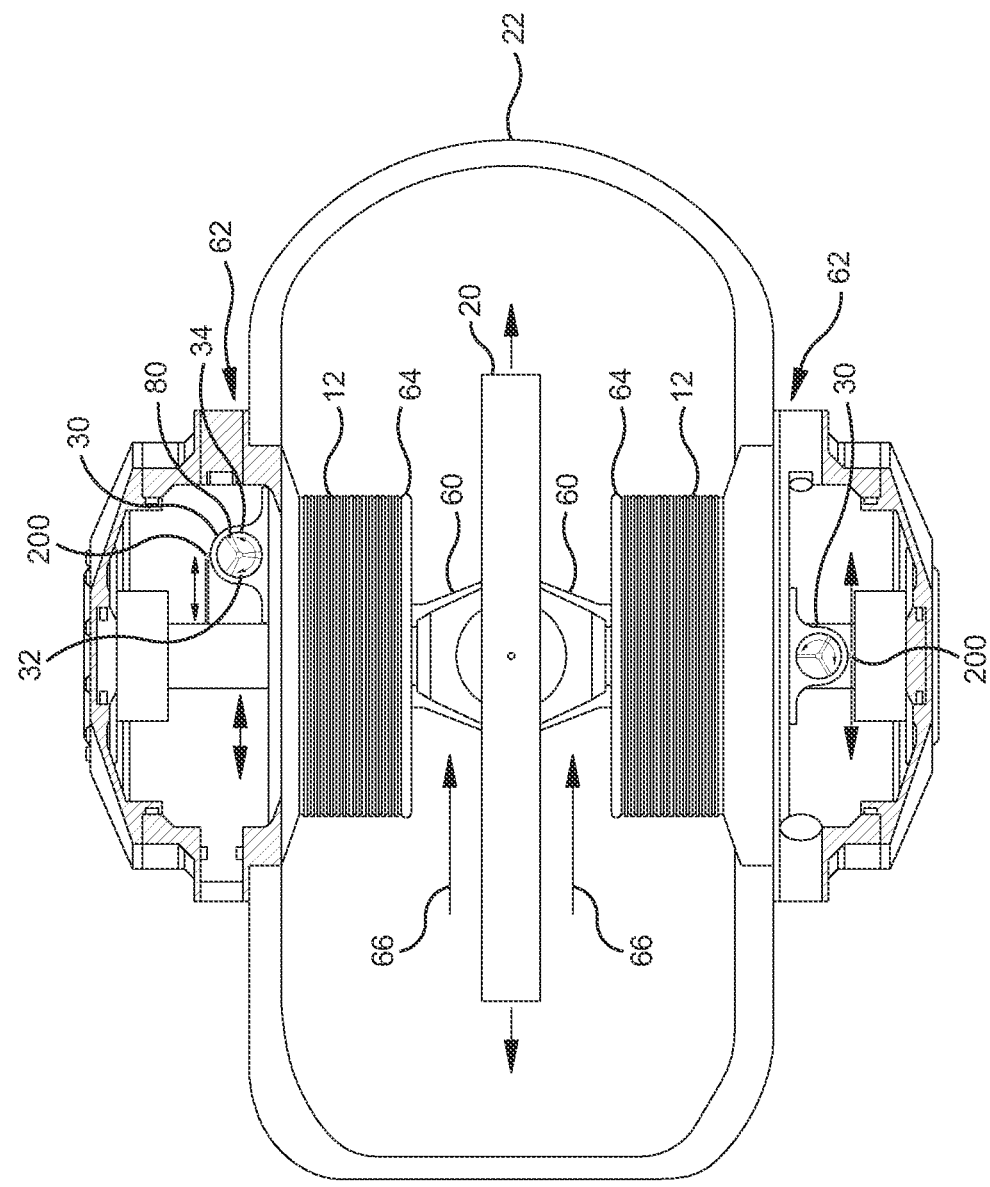
FIG. 12 shows an embodiment of the invention.
Figure 13:
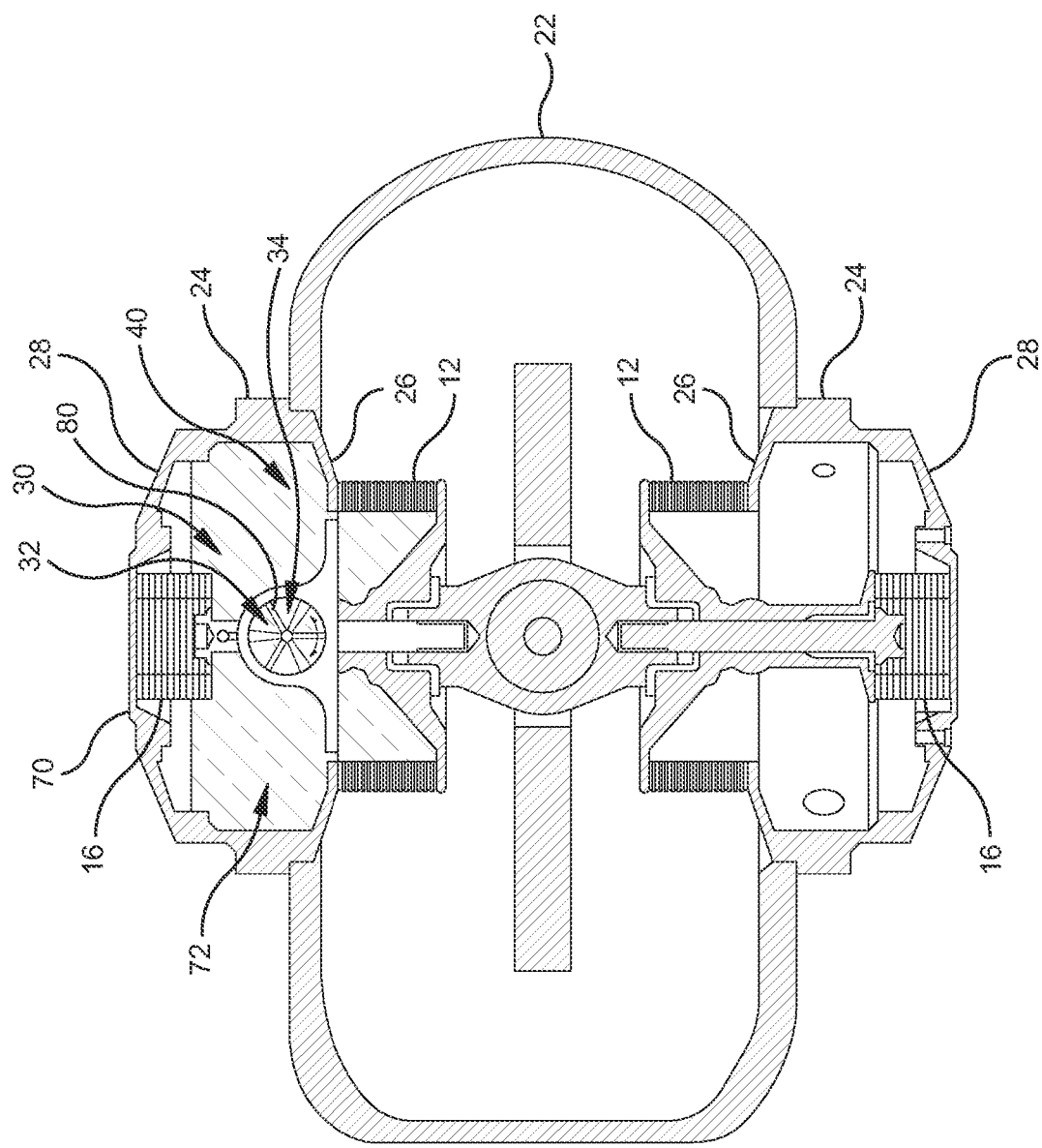
FIG. 13 shows an embodiment of the invention.
Figure 14A:
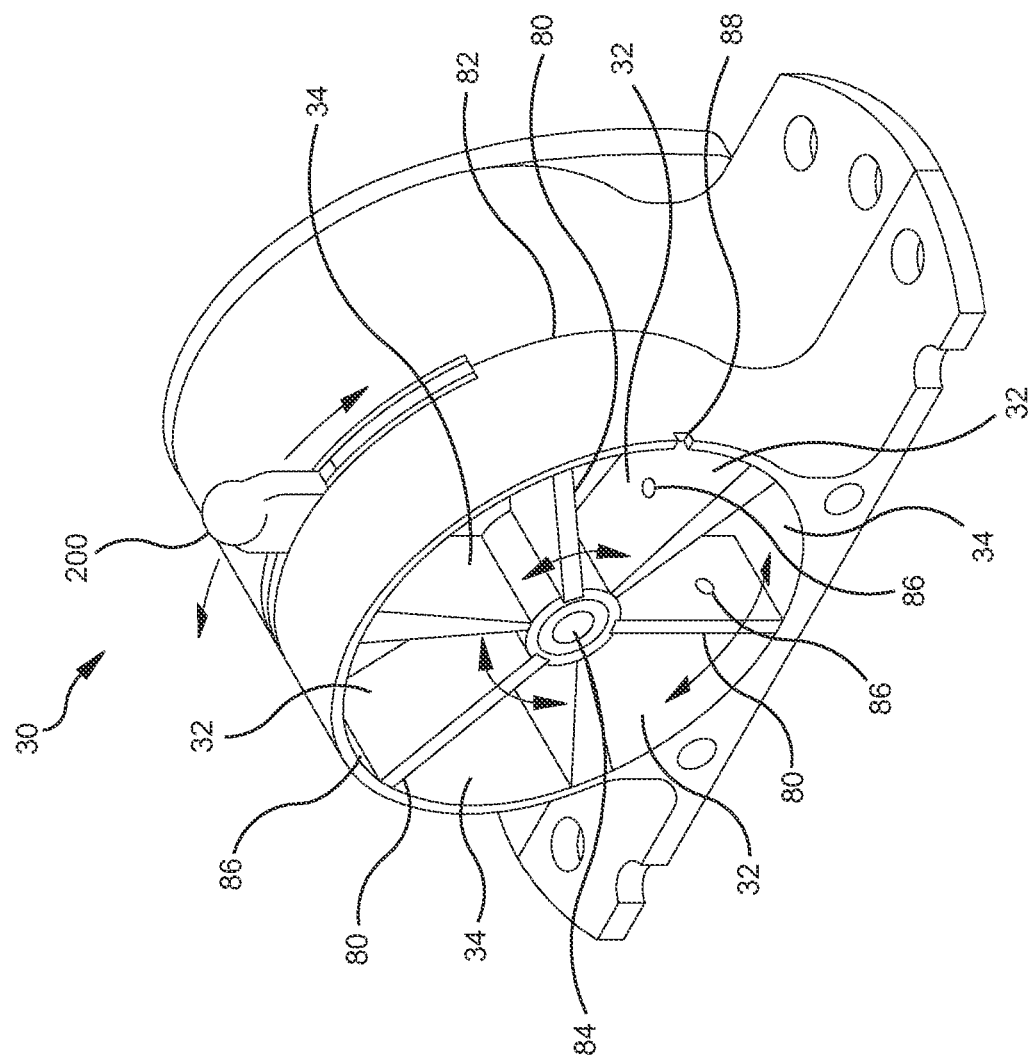
FIGS. 14A-C show embodiments of the invention.
Figure 14B:
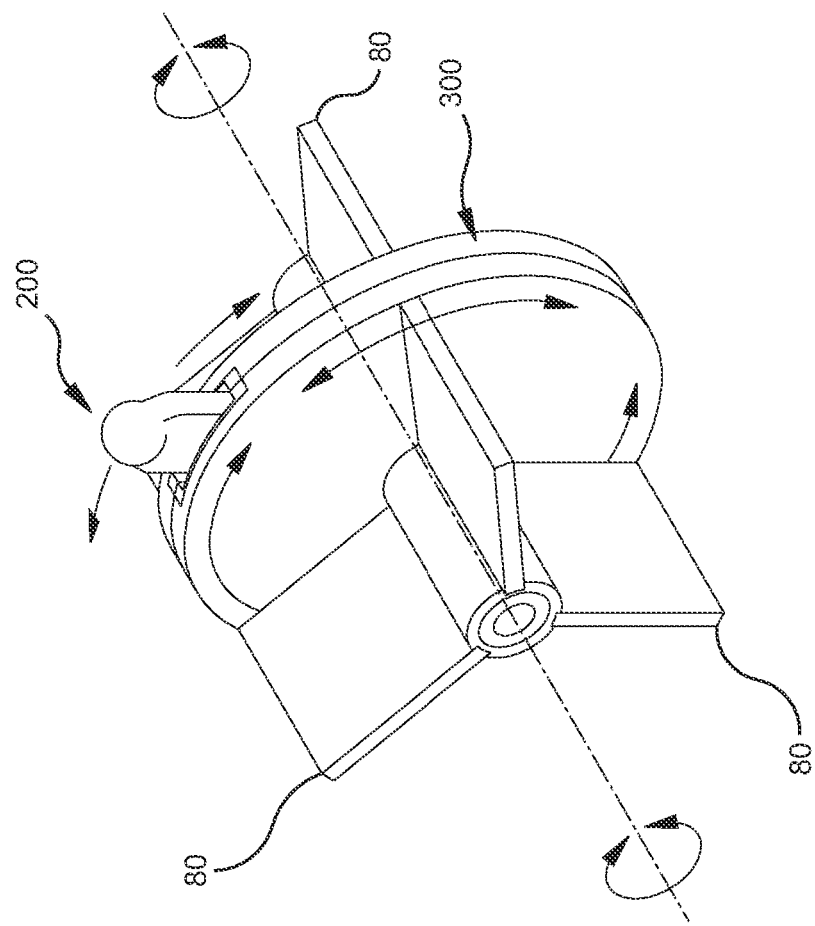
Figure 14C:
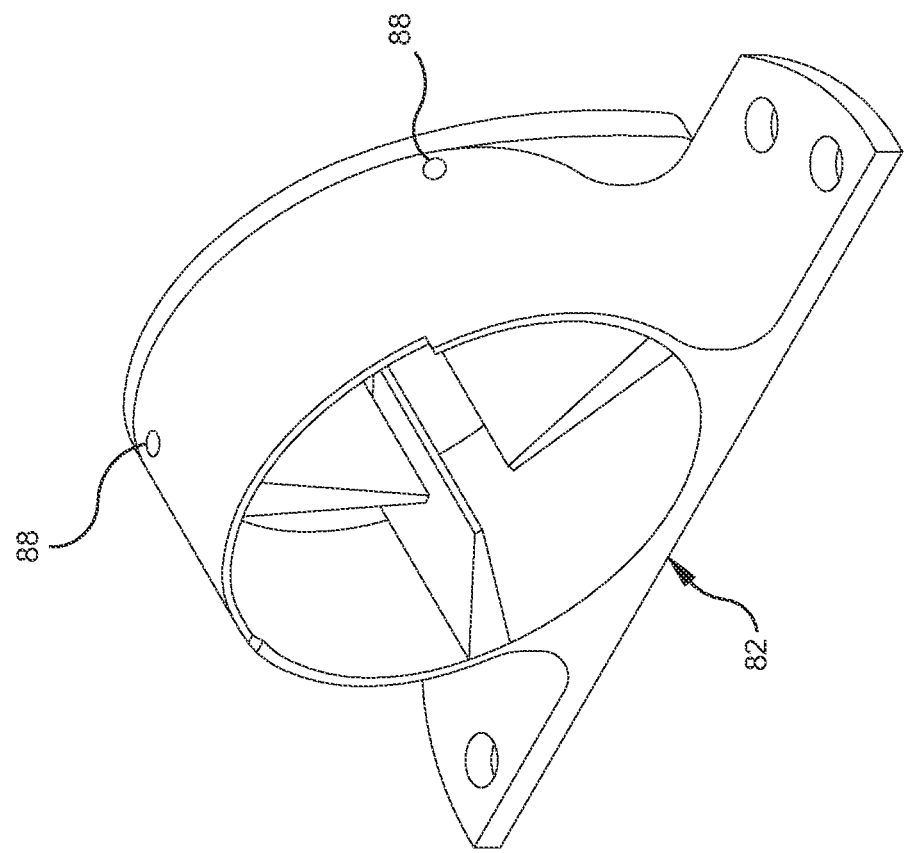
Figure 15:
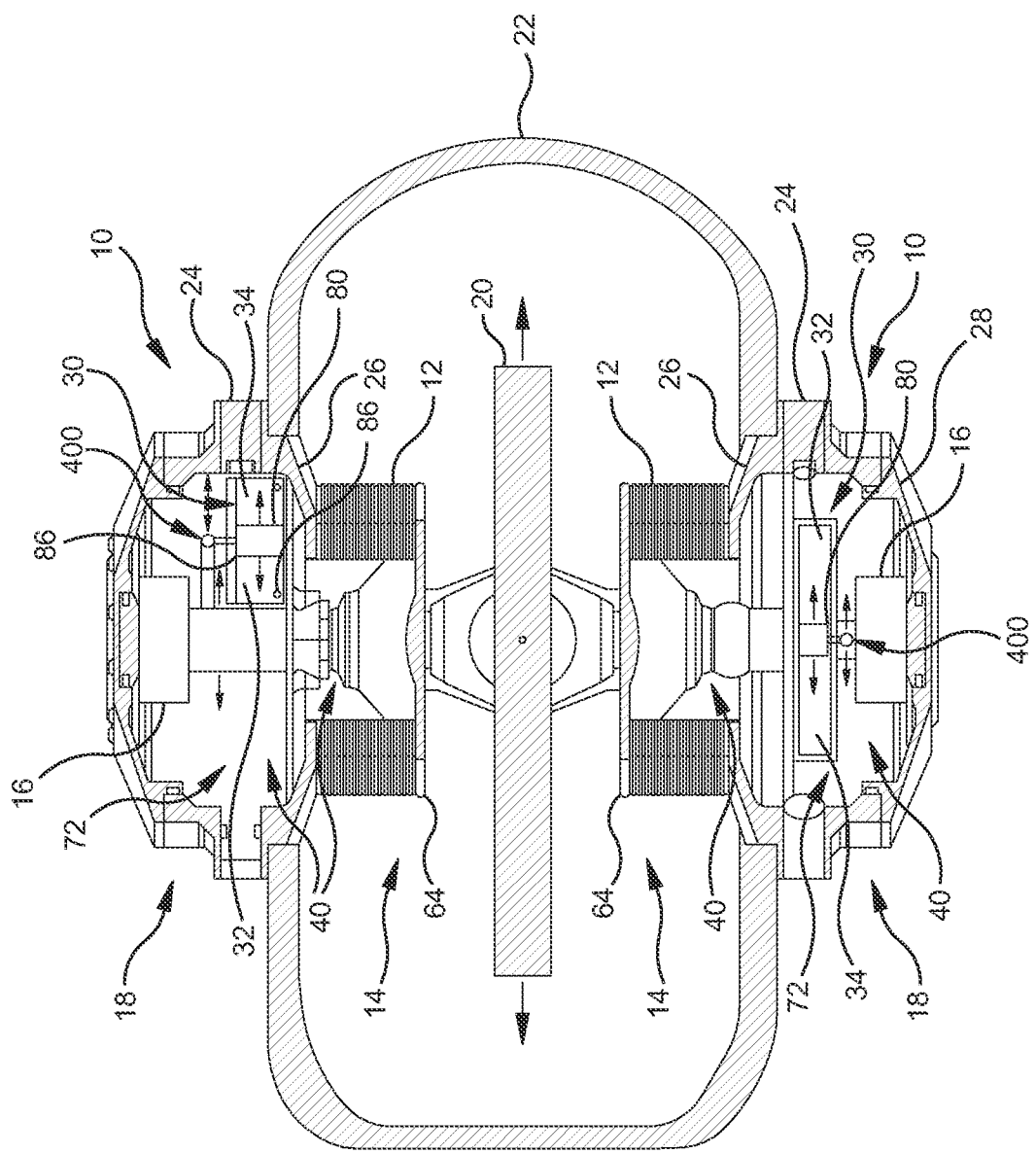
FIG. 15 shows an embodiment of the invention.
Figure 16:
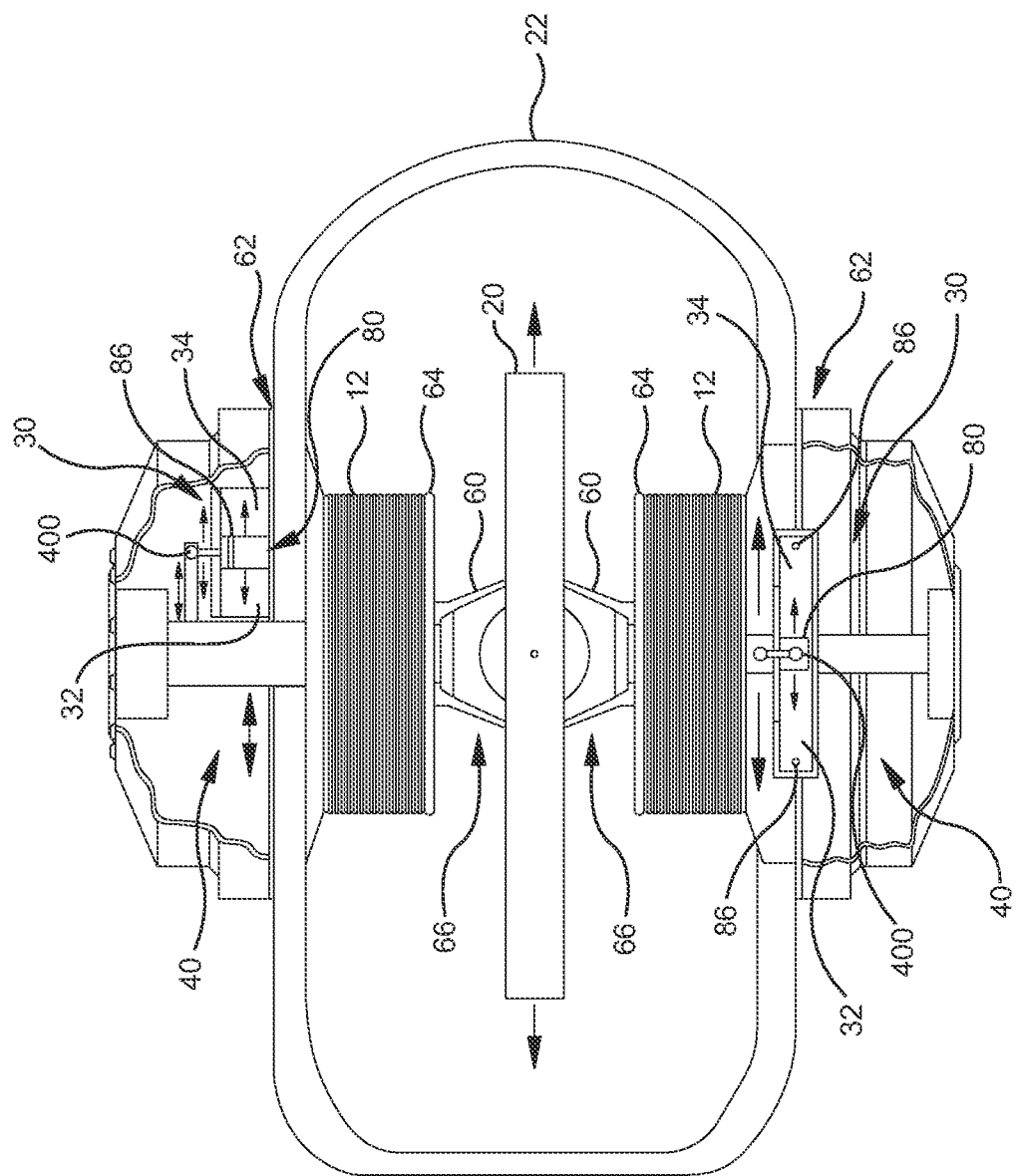
FIG. 16 shows an embodiment of the invention.
Figure 17:
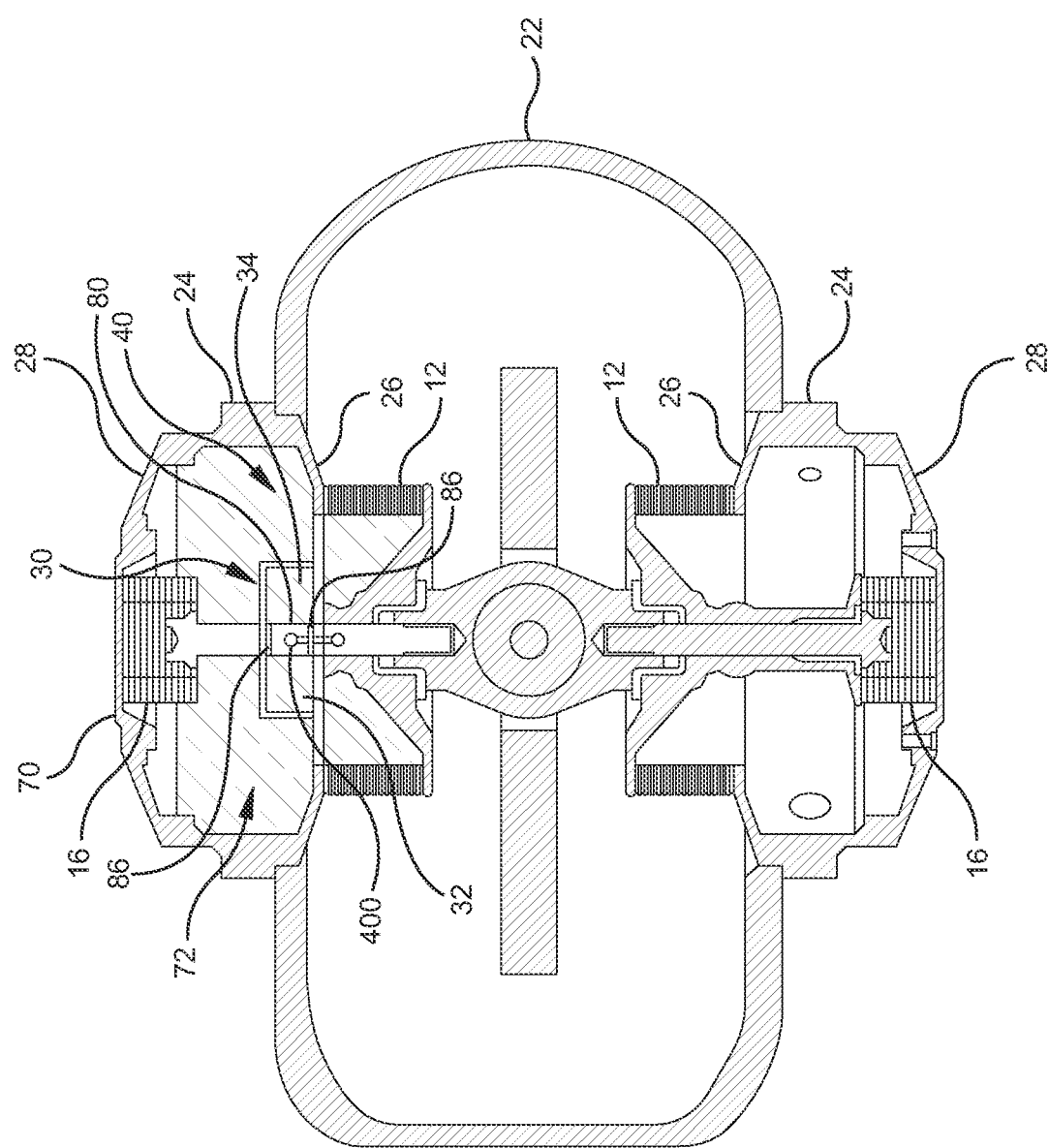
FIG. 17 shows an embodiment of the invention.
Figure 18A:
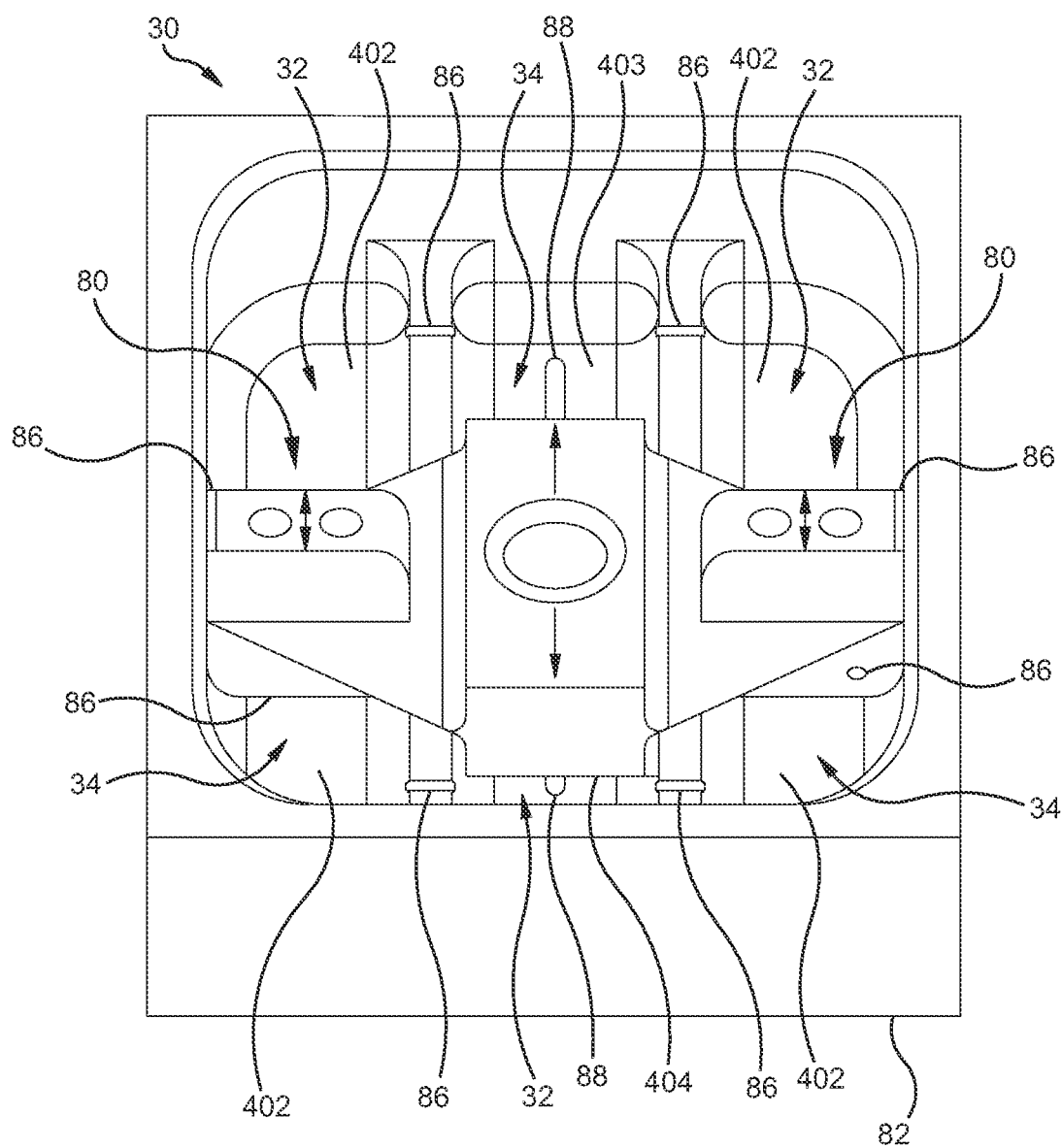
FIGS. 18A-D show embodiments of the invention.
Figure 18B:
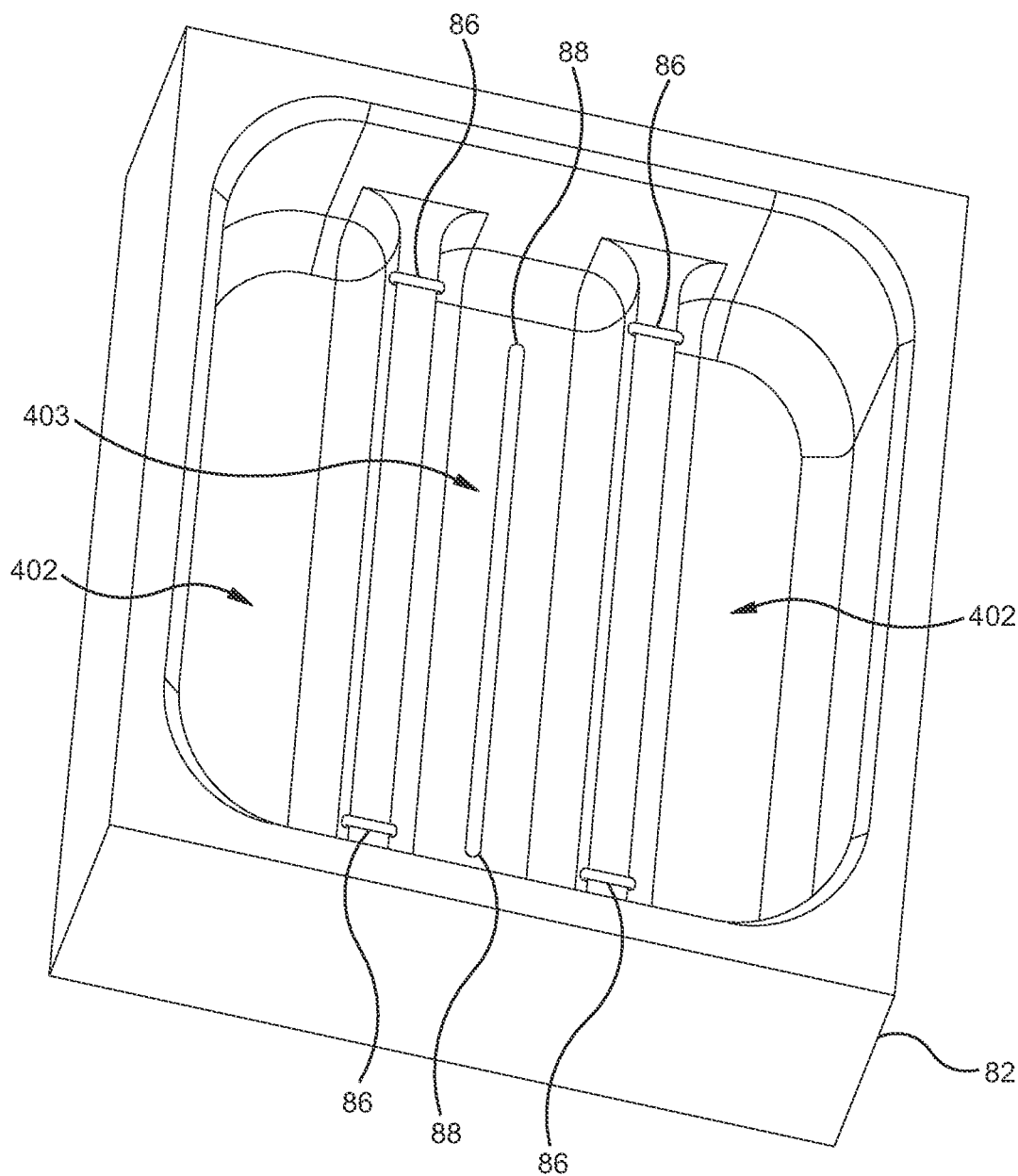
Figure 18C:
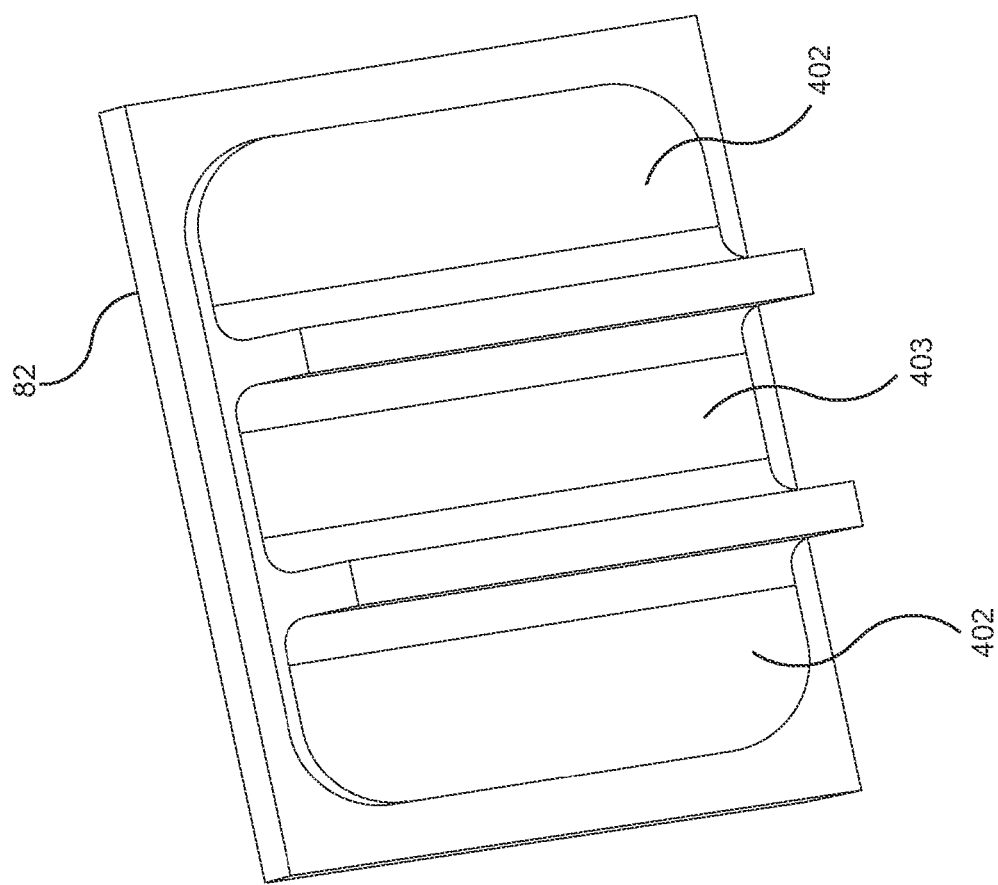
Figure 18D:
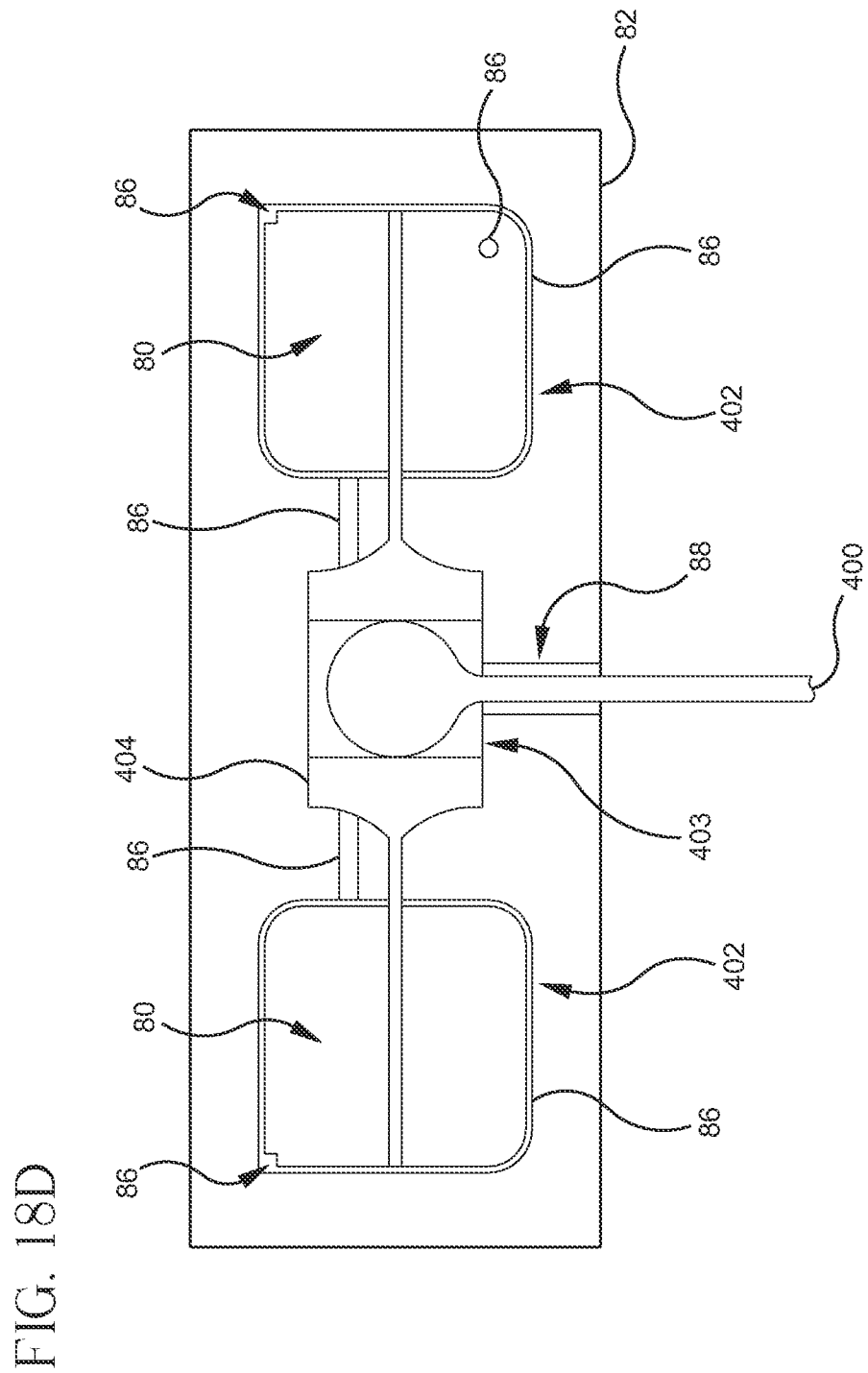
Figure 19:
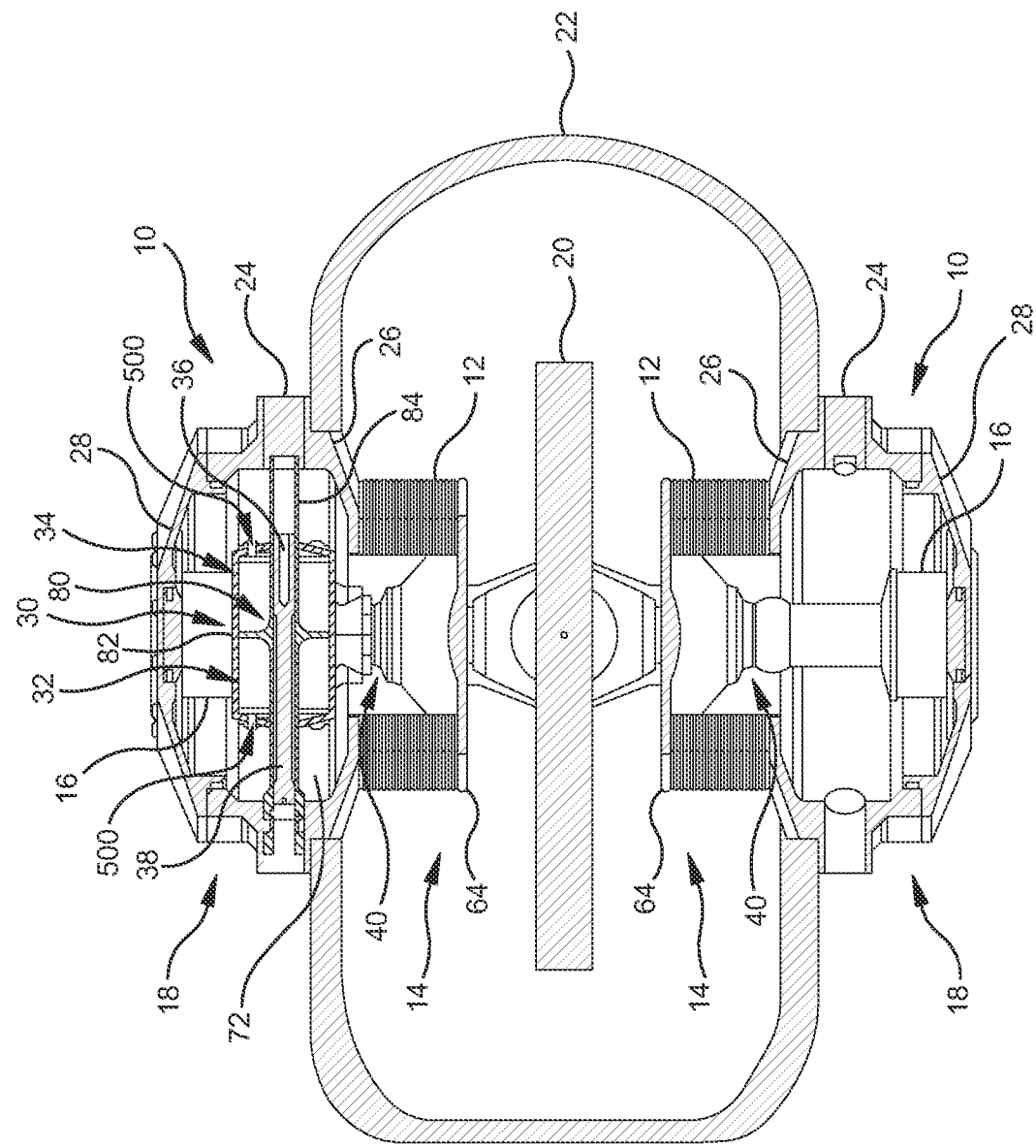
FIG. 19 is a cross-sectional side view of an embodiment of the fluid-elastomeric damper assembly of the present invention.
Figure 20:
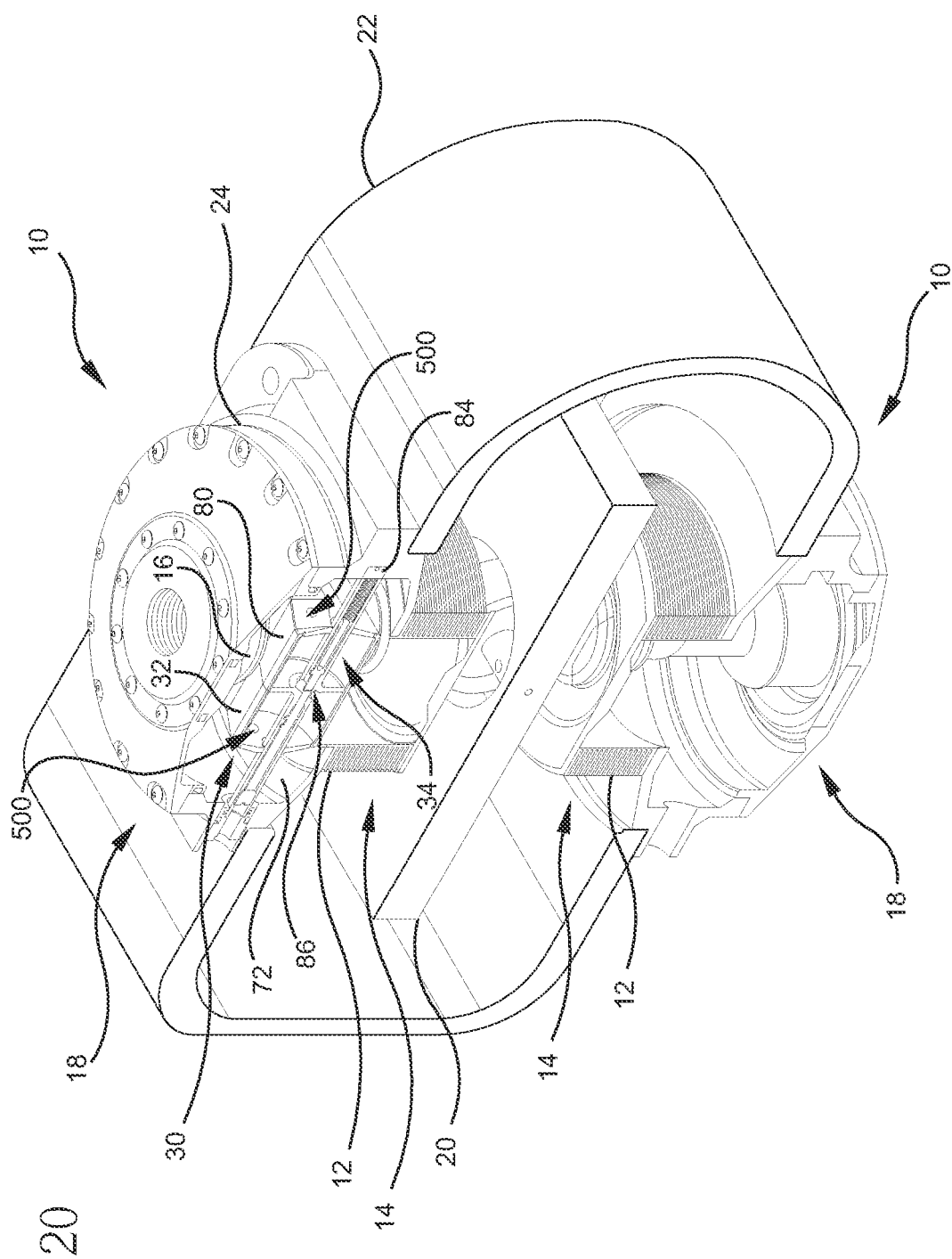
FIG. 20 is a perspective view of the fluid-elastomeric damper assembly of FIG. 19.

Advantageously, the first elastomer seal 12, the second elastomer seal 16, the housing structure 24, and the substantially circular base plate 64 provide a fluid-elastomeric chamber 40 operable for containing the fluid and in which the internal pumping mechanism 30 may be submerged. This fluid-elastomeric chamber 40 is flexible and allows the internal pumping mechanism 30 to damp movement/vibration in a primary direction with a relatively high damping force. Movement/vibration in a plurality of other directions are also accommodated by design, due to the coupling features of the internal pumping mechanism 30. It should be noted that two (2) fluid-elastomeric damper assemblies 10 are illustrated and used in combination such as in FIG. 1 (and in other drawings described herein below) in order to damp lead-lag movement/vibration in the rotor of a rotary-wing aircraft or the like. FIG. 1 illustrates an upper fluid-elastomeric damper assembly 10 (top portion of FIG. 1) including an internal pumping mechanism 30 and a lower fluid-elastomeric damper assembly 10 (bottom portion of FIG. 1) without an internal pumping mechanism 30. The lower-fluid-elastomeric damper 10 assembly may, optionally, include an internal pumping mechanism 30, for example as shown in FIG. 11.

Figure 2:
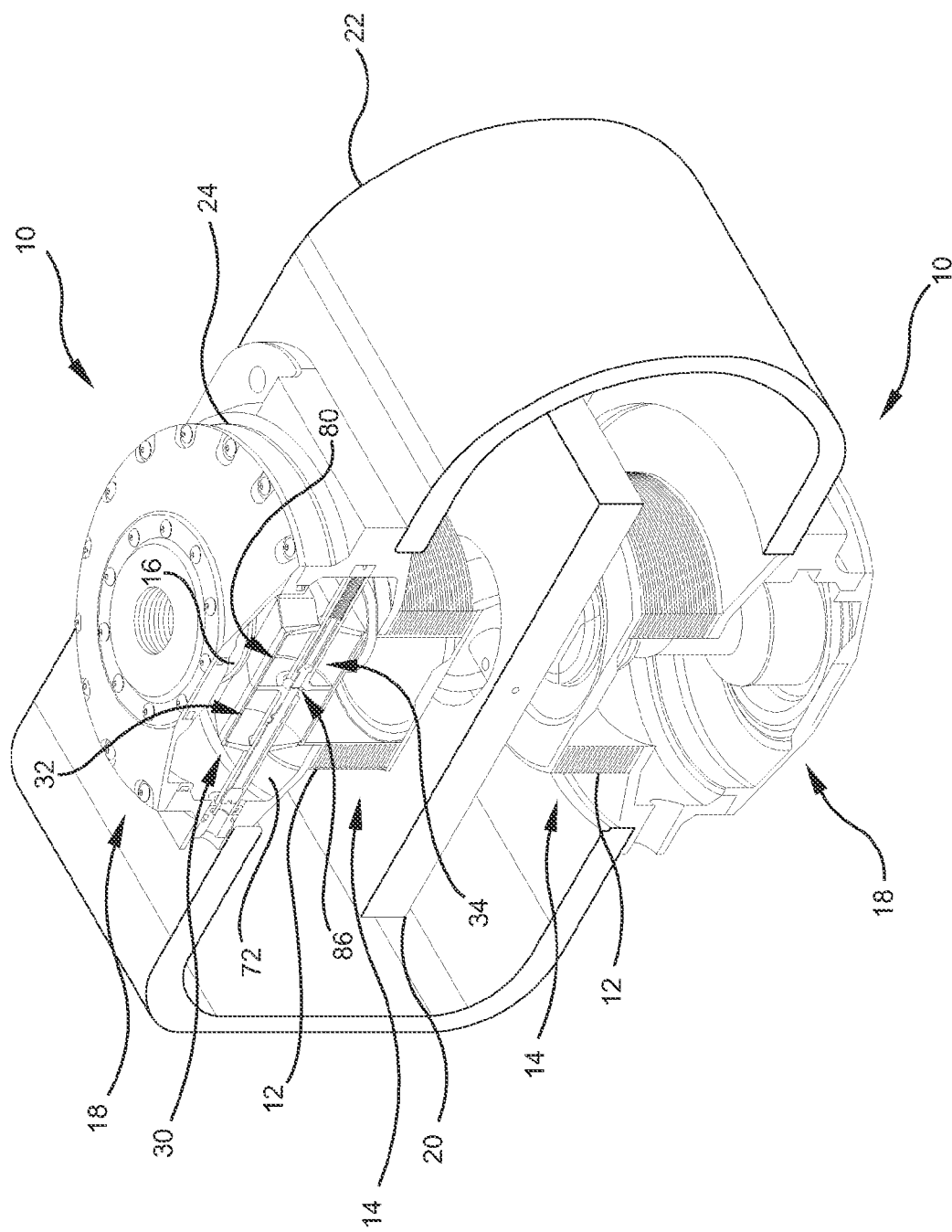
FIG. 2 is a perspective view of the fluid-elastomeric damper assembly of FIG. 1, again highlighting the internal pumping device disposed with the fluid-elastomeric chamber of the fluid-elastomeric damper assembly (the top portion of FIG. 2 illustrating the internal pumping device, the bottom portion of FIG. 2 illustrating the fluid-elastomeric chamber)

Referring to FIGS. 2 and 3, the first elastomer seal 12 disposed at the first end 14 of the fluid-elastomeric damper assembly 10 and the second elastomer seal 16 disposed at the second end 18 of the fluid-elastomeric damper assembly 10 may, optionally, include a plurality of metal or substantially rigid laminates (shims) 50 (FIG. 3) or the like disposed within a rubber seal 52 (FIG. 3) or the like. This configuration provides both the first elastomer seal 12 and the second elastomer seal 16 with strength/rigidity and flexibility/pliability.

Both the first elastomer seal 12 and the second elastomer seal 16 may have a substantially cylindrical or conical shape, although other suitable shapes may be utilized. In an exemplary embodiment of the present invention, the diameter of the second elastomer seal 16 is between about one-third (⅓) and about three-quarters (¾) the diameter of the first elastomer seal 12. Other shapes and sizes may, however, be used as necessary.

Figure 5:
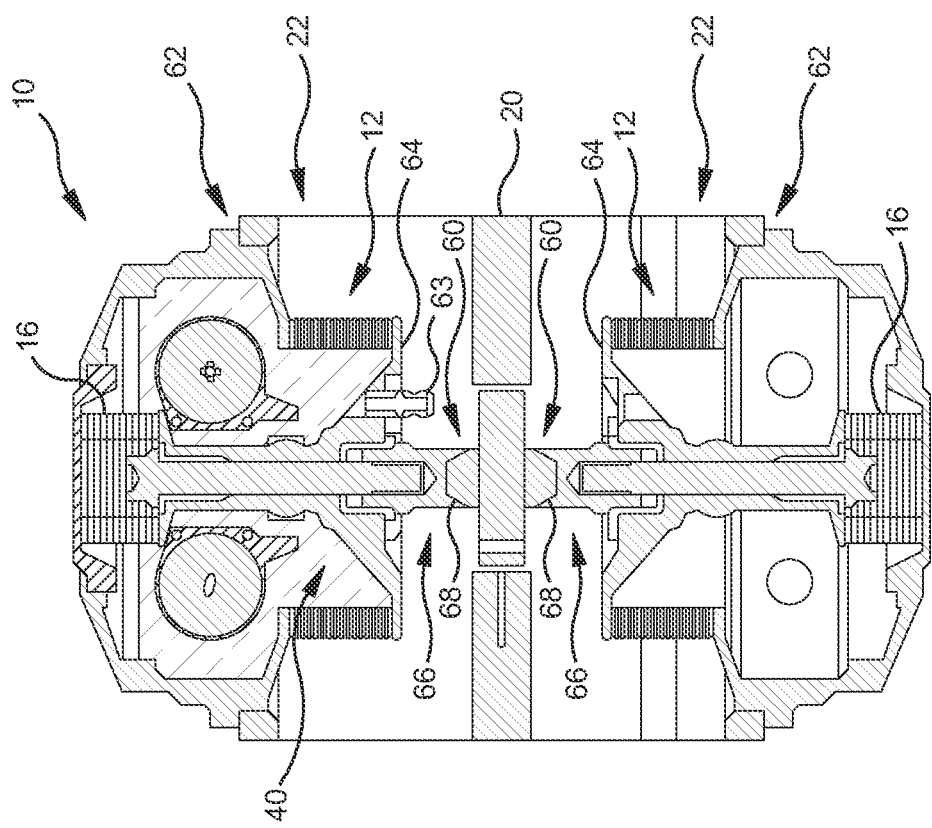
FIG. 5 is a cross-sectional front (beam-wise) view of the fluid-elastomeric damper assembly of FIGS. 1-4 (the top portion of FIG. 5 illustrating the internal pumping device, the bottom portion of FIG. 5 illustrating the fluid-elastomeric chamber)
Figure 6:
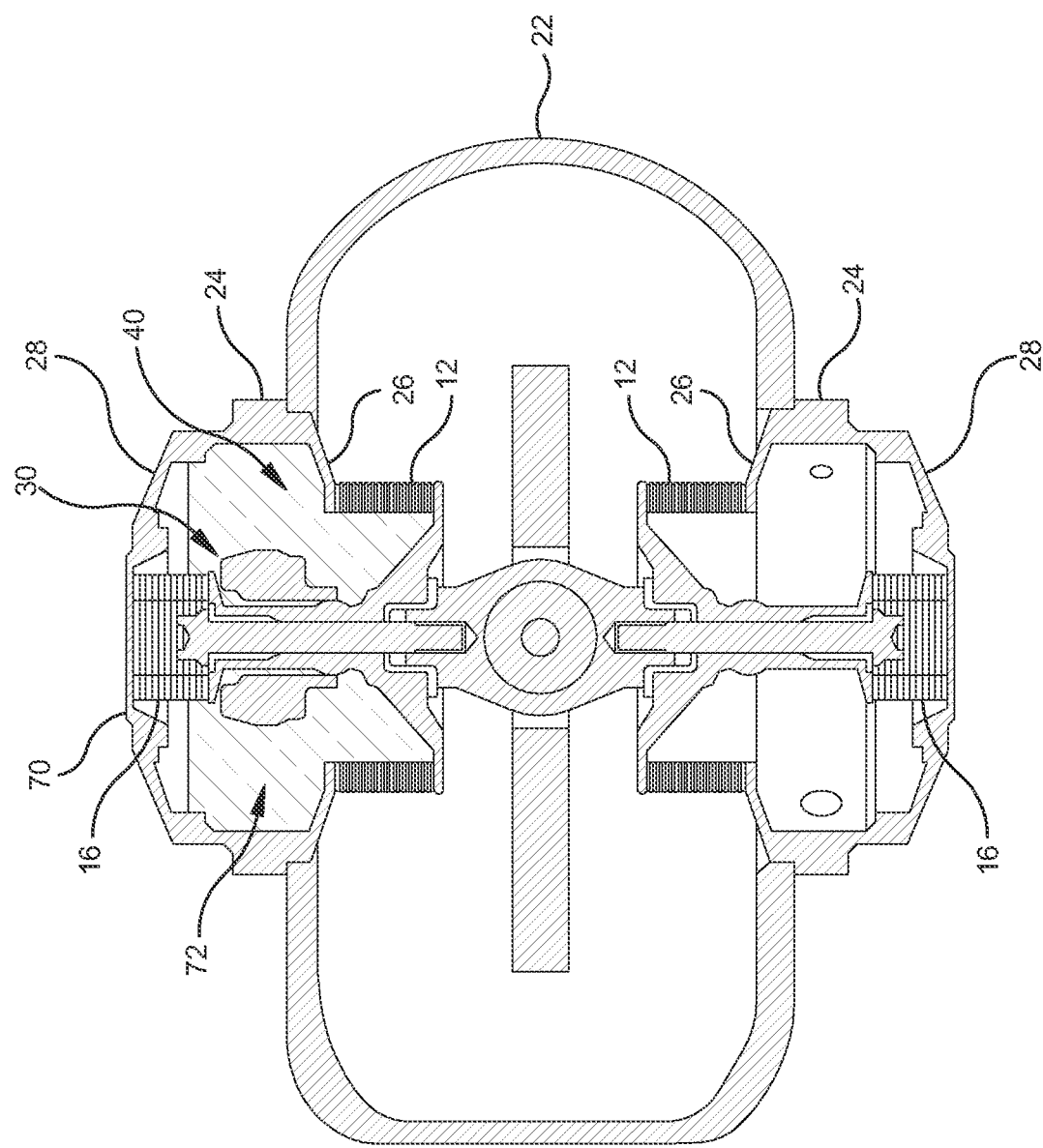
FIG. 6 is another cross-sectional side (cord-wise) view of the fluid-elastomeric damper assembly of FIGS. 1-5 (the top portion of FIG. 6 illustrating the internal pumping device, the bottom portion of FIG. 6 illustrating the fluid-elastomeric chamber)

The first elastomer seal 12 is fixedly attached or otherwise coupled to the first moving/vibrating structure 20, such as a flex-beam of the rotor of a rotary-wing aircraft or the like, via a first attachment mechanism 60. Likewise, the first elastomer seal 12 and the second elastomer seal 16 (FIG. 5) are fixedly attached or otherwise coupled to the second moving/vibrating structure 22, such as a pitch case of the rotor of a rotary-wing aircraft or the like, via a second attachment mechanism 62. The first attachment mechanism 60 may include, for example, the substantially circular base plate 64 bonded, fixedly attached, or otherwise coupled to the first elastomer seal 12 and the second elastomer seal 16. The base plate 64 is fixedly attached or otherwise coupled to one or more spanning members 66 that are, in turn, fixedly attached or otherwise coupled to a compliant member 68 (FIG. 5) associated with the first moving/vibrating structure 20. The base plate 64, the one or more spanning members 66, and the compliant member 68 may be made of, for example, a metal or any other substantially rigid material. Optionally, the base plate 64, the one or more spanning members 66, and/or the compliant member 68 may be integrally formed. Although an exemplary first attachment mechanism 60 has been described herein, any other first attachment mechanism 60 operable for fixedly attached or otherwise coupling the first elastomer seal 12 and the base plate 64 to the first moving/vibrating structure 20 may be used. As is described in greater detail herein below, the second attachment mechanism 62 fixedly attached or otherwise coupled to the second moving/vibrating structure 22 may, optionally, be integrally formed/coincident with the housing structure 24 (FIG. 1). Optionally, the fluid-elastomeric damper assembly 10 of the present invention further includes a gas charge/discharge valve 63 operable for introducing damping fluid and/or a gas, such as nitrogen or the like, into and/or removing damping fluid and/or a gas from the fluid-elastomeric chamber 40.

The first elastomer seal 12 and the second elastomer seal 16 are both bonded, fixedly attached, or otherwise coupled to the housing structure 24, which may be made of, for example, a metal or any other substantially rigid material. In an exemplary embodiment of the present invention, the housing structure 24 includes a first housing member 26 and a second housing member 28. The first housing member 26 may be a substantially cup-shaped structure. Accordingly, the second housing member 28 may be a substantially disc-shaped structure. Optionally, the housing structure 24 may also include a third, substantially disc-shaped housing member 70 that, together with the first housing member 26 and the second housing member 28, serves as the second attachment mechanism 62, fixedly attaching or otherwise coupling the first elastomer seal 12 and the second elastomer seal 16 to the second moving/vibrating structure 22. The first housing member 26, the second housing member 28, and the third housing member 70 may be bolted or otherwise attached together, or they may be integrally formed. Together, the first elastomer seal 12, the second elastomer seal 16, and the housing structure 24 are operable for containing the fluid 72, such as hydraulic fluid or the like, in the fluid-elastomeric chamber 40. The fluid-elastomeric chamber 40 partially formed by the first elastomer seal 12, the second elastomer seal 16, and the housing structure 24 may, optionally, have a plurality of circular diameters substantially conforming to the shape of the internal pumping mechanism 30 disposed therein.

The internal pumping mechanism 30 disposed within the housing structure 24 is grounded to the first moving/vibrating structure 20 and moves in relation to the housing structure 24, which is grounded to the second moving/vibrating structure 22. The internal pumping mechanism 30 includes one or more piston structures 80 disposed within a piston structure housing 82. Preferably, the one or more piston structures 80 include one or more substantially cylindrical, hollow structures. Preferably, the one or more piston structure housings 82 are free to move along one or more axially-extending structures 84 (FIG. 3), such as hollow and/or solid rods or the like, integrally formed with the piston assembly. Preferably the piston structure housing 82 is grounded to the first moving/vibrating structure 20 by a stem piece (not shown) that may be integrally formed with the base plate 64 or, optionally, may include a plurality of components. The piston structure housing 82 may be constructed in multiple sections to allow grounding of the piston structure housing 82 to the stem piece of the base plate 64. The one or more piston structures include a first chamber 32 and a second chamber 34 separated by the piston assembly, with the first chamber 32 and the second chamber 34 in fluid communication through a pumping piston restriction, i.e., an orifice 86. The piston assembly extends through the piston structure housing 82 to the housing structure 24, to which it is grounded. A plurality of relatively small holes 88 are disposed within the walls of the one or more piston structures 80 and the piston structure housing 82, allowing trapped gas and a limited flow of the fluid 72 between the fluid-elastomeric chamber 40 and the internal pumping mechanism 30. Additionally, clearance between the piston structure housing 82 and the piston assembly allow a limited flow of fluid between the fluid-elastomeric chamber 40 and the internal pumping mechanism 30. The pumping piston restriction orifices 86 represents the path of least resistance for the fluid 72 within the fluid-elastomeric chamber 40 with the orifices 86 sized relatively large compared to the small holes 88. The internal pumping mechanism 30 is configured such that, when the one or more piston structure housing 82 move with respect to the housing structure 24 and the second/moving vibrating structure 22, the fluid 72 surrounding and disposed within the one or more piston structures is pumped from the first chamber 32 to the second chamber 34 by the movement of piston structures 80 with the fluid 72 pumped back and forth between the first and second chambers through the orifice 86. As shown in FIGS. 1-3, the relative linear motion between the first moving structure 20 and the second moving structure 22 drives the linear reciprocating motion of the internal pumping mechanism 30, and forces the flow of fluid 72 through the orifice 86 between the first chamber 32 and the second chamber 34. As shown in FIGS. 11-14, the relative linear motion between the first moving structure 20 and the second moving structure 22 drives the rotational reciprocating motion of the internal pumping mechanism 30 with the rotation of the rotational plate piston 80 forcing the flow of fluid 72 through the orifices 86 between the first chambers 32 and the second chambers 34. Preferably a sliding actuating pin decoupler ball linear to rotational linkage 200 and a linear to rotational load transfer disk 300 couples the reciprocating linear motion into the reciprocating rotational motion that drives the rotational plate piston 80 in its piston channel and forces the pumping flow of fluid 72 through orifices 86. As shown the pumping piston restriction orifice 86 can be in the rotational plate piston 80, in the stationary plate housing 82, and/or the clearance between the rotational plate piston 80 and the housing 82. Preferably the actuating pin translates the linear motion relative to the supporting structure into the rotational motion of rotational plates radial pistons 80 which pumps fluid 72 through restrictions 86 between the chambers. This fluid restriction 86 creates fluid damping forces. The reciprocating rotating radial piston structures 80 reduce the dynamic stiffness of the overall system by minimizing dynamic fluid forces on the elastomer portions of the damping device allowing for greater amounts of damping to be generated over devices which rely on elastomeric interfaces to force fluid motion. The rotational nature of the pistons allow for damping to be generated through large amplitude linear motions of the support structure where linear motion pistons may be troublesome. As shown in FIGS. 15-18, the relative linear motion between the first moving structure 20 and the second moving structure 22 drives the linear reciprocating motion of the internal pumping mechanism 30 with the linear parallel motion of the twin plate pistons 80 in the parallel piston slide channels 402 forcing the flow of fluid 72 through the orifices 86 between the first chambers 32 and the second chambers 34. Preferably a sliding actuating pin decoupler ball linear linkage 400 couples the reciprocating linear motion into the reciprocating linear motion of center piston slider 404 in piston slider center channel 403 and twin plate pistons 80 in parallel piston slide channels 402 and forces the pumping flow of the fluid through orifices 86. As shown the pumping piston restriction orifice 86 can be in the plate piston 80, the clearance between the edge of plate piston 80 and the walls of the parallel piston slide channels 402, and/or in the housing 82 such as orifices 86 through the housing walls separating piston slide channels 402 and piston slider center channels 403. The linear motion of plate pistons 80 in parallel piston slide channels 402 pumps fluid 72 through restrictions 86 between the chambers 32 and 34. As shown in FIGS. 15-18 preferably the internal pumping mechanism 30 includes a pair of linearly reciprocating plate pistons 80 that linearly reciprocate in a pair of parallel piston slide channels 402, driven by a piston slider 404 that linearly reciprocates in a piston slider center channel 403. In a preferred embodiment the internal pumping mechanism 30 includes a reciprocating plate piston 80 in a piston channel, most preferably a linearly reciprocating plate piston 80 in a piston slide channel 402.

The invention includes a fluid-elastomeric damper assembly 10 operable for damping a relative motion between a first structure 22 and a second structure 20, the fluid-elastomeric damper assembly 10 comprising: a plurality of elastomer seals 12, 16 coupled to the housing 24 of the first structure 22, wherein the first structure housing 24 and the plurality of elastomer seals define a fluid-elastomeric chamber 40 operable for containing a fluid 72; an internal pumping mechanism 30 with at least one fluid moving piston 80 disposed within the first structure housing 24 and the fluid-elastomeric chamber 40, wherein the internal pumping mechanism 30 is grounded to the first structure and driven by the second structure, and wherein the at least one piston 80 forces said fluid 72 through at least one orifice 86 between a first substantially fluid-filled chamber 32 and a second substantially-fluid-filled chamber 34 which are in fluid communication with the fluid-elastomeric chamber 40; and wherein said relative motion between said first structure 22 and said second structure 20 is operable for pumping the fluid 72 through said at least one orifice 86. In a preferred embodiment the at least one fluid moving piston 80 is a linearly reciprocating piston structure that pumps said fluid with a linear motion. In an alternative preferred embodiment the at least one fluid moving piston 80 is a rotational plate and pumps said fluid with a rotational motion.

The invention includes a method for damping a relative motion between a first structure 22 and a second structure 20. The method comprises grounding a housing 24 to the first structure 22; coupling a plurality of elastomeric seals 12, 16 to the housing, wherein the housing 24 and the plurality of elastomeric seals 12, 16 provide a fluid-elastomeric chamber 40 for containing a fluid 72; disposing a fluid 72 within the fluid-elastomeric chamber 40; disposing an internal fluid pump 30 with at least one fluid moving piston 80 within the housing and the fluid-elastomeric chamber and grounding the internal fluid pump 30 to the first structure, wherein the internal fluid pump 30 comprises a first substantially fluid-filled chamber 32 and a second substantially fluid-filled chamber 34 in communication via at least one orifice 86, said first substantially fluid-filled chamber 32 and said second substantially fluid-filled chamber 34 in communication with the fluid-elastomeric chamber 40; wherein said relative motion between said first structure 22 and said second structure 20 drives said at least one fluid moving piston 80 to pump said fluid 72 through said at least one orifice 86. In a preferred embodiment the at least one fluid moving piston 80 is a linearly reciprocating piston and pumps said fluid 72 through said at least one orifice 86 with a linear motion. In an alternative preferred embodiment said at least one fluid moving piston 80 is a rotational reciprocating piston and pumps said fluid 72 through said at least one orifice 86 with a rotational motion.

The invention includes a method of making a rotary-wing aircraft fluid-elastomeric damper assembly 10 for damping a relative motion between a first rotary-wing aircraft structure 22 and a second rotary-wing aircraft structure 20 in a rotary-wing aircraft. The method includes coupling a plurality of elastomeric seals 12, 16 to a housing 24, wherein the housing 24 and the plurality of elastomeric seals 12, 16 provide a fluid-elastomeric chamber 40 for containing a fluid 72; disposing an internal fluid pump 30 with at least one fluid moving piston 80 within the housing 24 and the fluid-elastomeric chamber 40 and grounding the internal fluid pump 30 to the first structure, disposing a fluid 72 within the fluid-elastomeric chamber 40 wherein the internal fluid pump 30 comprises a first substantially fluid-filled chamber 32 and a second substantially fluid-filled chamber 34 in communication via at least one orifice 86, said first substantially fluid-filled chamber 32 and said second substantially fluid-filled chamber 34 in communication with the fluid-elastomeric chamber 40; wherein said relative motion between said first structure 22 and said second structure 20 drives said at least one fluid moving piston 80 to pump said fluid 72 through said at least one orifice 86. In a preferred embodiment said at least one fluid moving piston 80 is a linearly reciprocating piston that pumps said fluid 72 through said at least one orifice 86 with a linear motion. In an alternative preferred embodiment said at least one fluid moving piston 80 is a rotational reciprocating piston that pumps said fluid 72 through said at least one orifice 86 with a rotational motion. In a preferred embodiment the fluid moving piston 80 is a reciprocating plate piston in a piston channel, most preferably a pair of linearly reciprocating plate pistons 80 in a pair of parallel piston slide channels 402.

Thus, the first elastomer seal 12, the second elastomer seal 16, the housing structure 24, and the base plate 64 provide a fluid-elastomeric chamber 40 operable for containing the fluid 72 and in which the internal pumping mechanism 30 may be submerged. This fluid-elastomeric chamber 40 is flexible and allows the internal pumping mechanism 30 to damp movement/vibration in a primary direction with a relatively high damping force.

Figure 7:
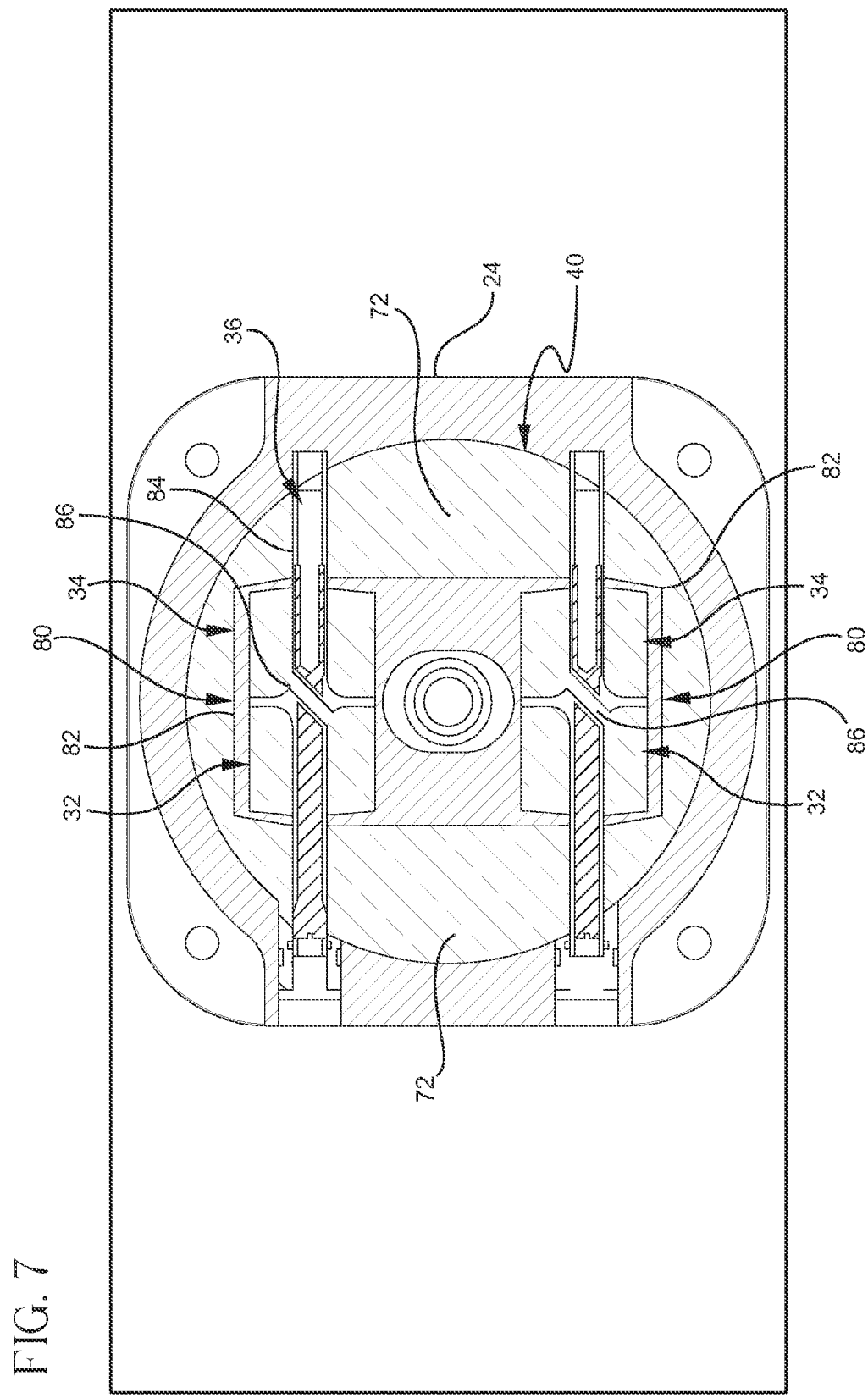
FIG. 7 is a cross-sectional top view of the fluid-elastomeric damper assembly of FIGS. 1-6, again highlighting the internal pumping device disposed with the fluid-elastomeric chamber of the fluid-elastomeric damper assembly.

Referring to FIG. 7, as described above, an adjustable pressure relief device 36 and/or a temperature-compensating device 38 may be disposed within the one or more hollow axially-extending structures 84 (i.e., the piston assembly) that carry the one or more piston structures 80. The adjustable pressure relief device 36 includes a spring-loaded member 90 (FIG. 3) that partially protrudes into the orifice 86 (FIG. 3), selectively blocking a portion thereof and restricting the flow of fluid therethrough. The spring-loaded member 90 of the adjustable pressure relief device 36 is displaced in the presence of relatively high fluid pressure. The amount of force required to displace the spring-loaded member 90 of the adjustable pressure relief device 36 may be adjusted via an adjustment mechanism 92 (FIG. 3) disposed within the housing structure 24. Additionally, the spring-side of the hollow structure communicates with the fluid-elastomeric chamber 40 via one or more holes 93 (FIG. 3) disposed within and through the walls of the hollow portion of the piston assembly 84. These communication holes 93 allow a pressure differential to occur between the relatively high dynamic pressure at the orifice 86 and the steady ambient pressure of the fluid-elastomeric chamber 40, actuating the adjustable pressure relief device 36. The temperature-compensating device 38 includes a temperature-sensitive member 94 (FIG. 3) that partially protrudes into the orifice 86, selectively blocking a portion thereof and restricting the flow of fluid therethrough. Preferably, the temperature sensitive member has a predetermined thermal expansion coefficient such that the degree of flow restriction may be varied for a given change in temperature. The pressure relief device 36 and the temperature-compensating device 38 work together to provide a predetermined degree of damping. The grounding of the piston assembly to the housing structure 24 is accomplished by means of one or more retaining structures. The one or more retaining structures may be solid and/or hollow and allow for the adjustment of the internal mechanisms of the fluid-elastomeric damper assembly 10. Preferably, the one or more retaining structures form an integral seal with the piston assembly and the housing structure 24. The one or more retaining structures may allow access to either or both, if multiple retaining structures disposed adjacent to the appropriate mechanisms are used, the adjustable pressure relief device 36 and/or the temperature-compensating device 38.

Figure 8:
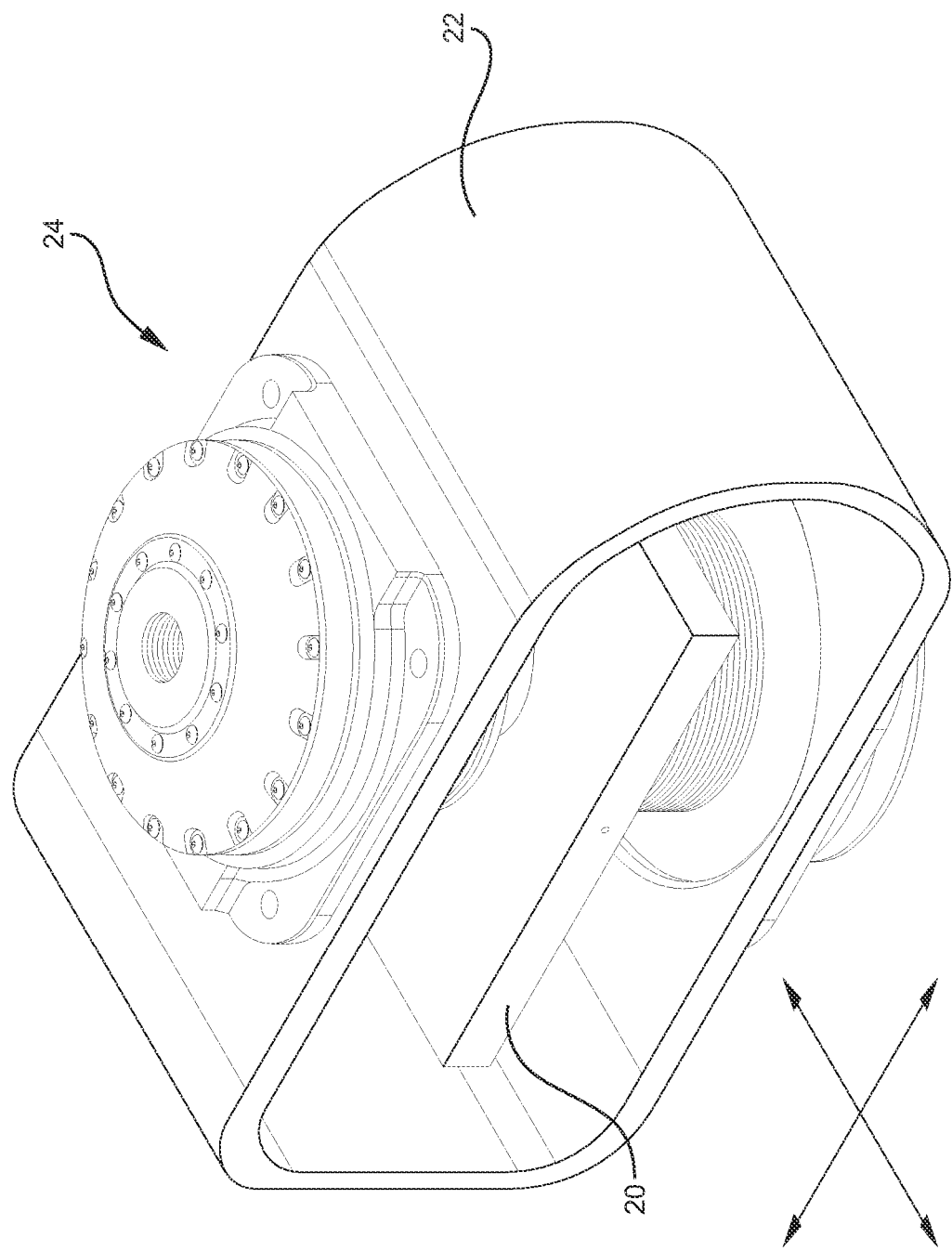
FIG. 8 is another perspective view of the fluid-elastomeric damper assembly of FIGS. 1-7.
Figure 9:
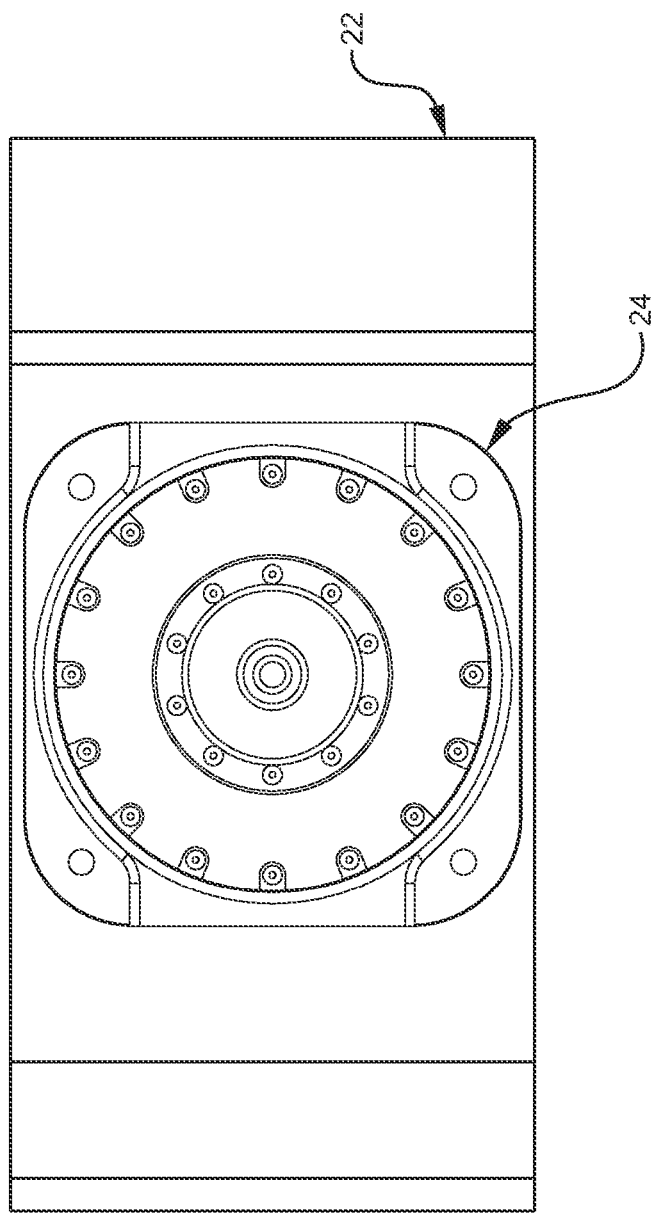
FIG. 9 is a top view of the fluid-elastomeric damper assembly of FIGS. 1-8.
Figure 10:
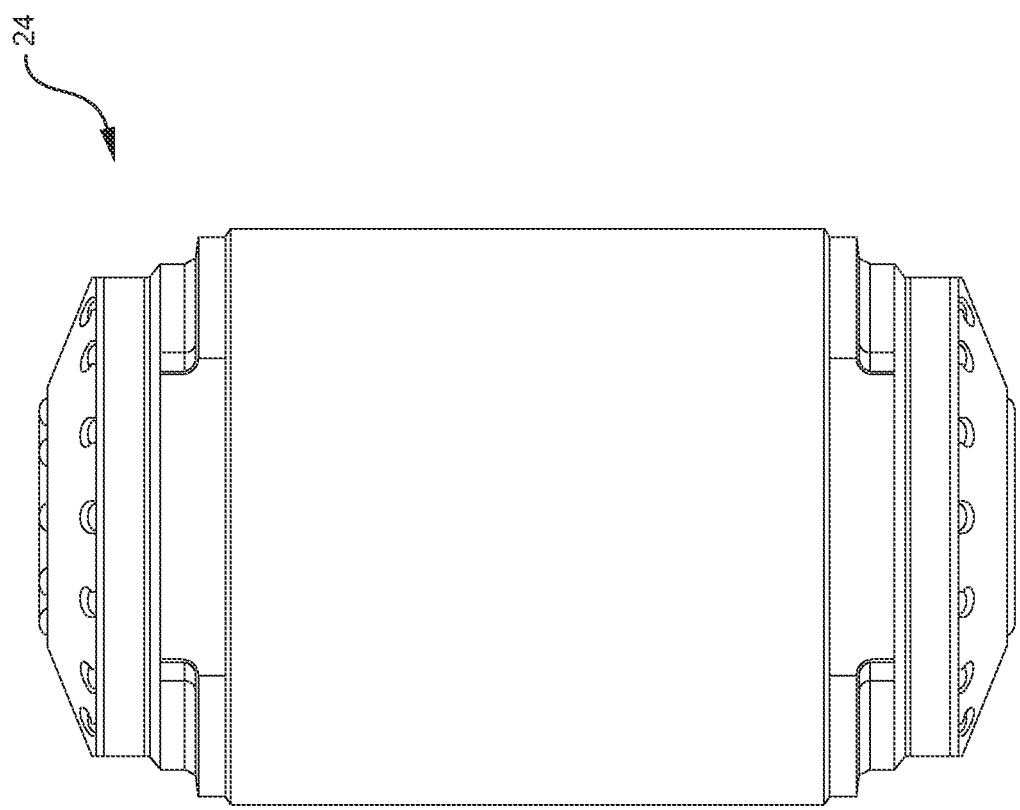
FIG. 10 is a front (beam-wise) view of the fluid-elastomeric damper assembly of FIGS. 1-9.

FIGS. 8, 9, and 10 provide several other views of the fluid-elastomeric damper assembly of the present invention, for use in conjunction with a typical flex-beam helicopter rotor assembly.

The invention includes a fluid-elastomeric damper assembly operable for damping a relative motion between a first structure and a second structure. Preferably the fluid-elastomeric damper assembly 10 provides beneficial damping of a relative motion between a first structure 20 and a second structure 22. The fluid-elastomeric damper assembly 10 preferably comprises a plurality of elastomer seals 12, 16 coupled to a fluid-elastomeric chamber housing 24, with the fluid-elastomeric chamber housing 24 and the elastomer seals 12, 16 providing a fluid-elastomeric chamber 40 operable for containing a damper fluid 72. The fluid-elastomeric damper assembly 10 preferably comprises an internal pumping mechanism 30 with at least one fluid moving piston 80 disposed within the fluid-elastomeric chamber 40. The fluid-elastomeric damper assembly internal pumping mechanism 30 preferably includes a first substantially fluid-filled variable volume chamber 32 and a second substantially fluid filled variable volume chamber 34 which are in fluid communication with the fluid-elastomeric chamber 40 in which it is disposed. The internal pumping mechanism 30 is grounded to the first structure 20 and driven by the second structure 22, wherein the at least one piston 80 forces the fluid 72 through at least one pumping piston restriction orifice 86 between the first fluid variable volume chamber 32 and the second fluid variable volume chamber 34. The first fluid chamber 32 includes a first fluid backfiller 500, the first fluid backfiller 500 providing fluid communication of the fluid 72 from the fluid-elastomeric chamber 40 into the first fluid chamber 32 and inhibiting a flow of the fluid 72 from the first fluid chamber 32 into the fluid-elastomeric chamber 40. The second fluid chamber 34 includes a second fluid backfiller 500, the second fluid backfiller 500 providing fluid communication of the fluid 72 from the fluid-elastomeric chamber 40 into the second fluid chamber 34 and inhibiting a flow of the fluid 72 from the second fluid chamber 34 into the fluid-elastomeric chamber 40. The relative motion between the first structure 20 and the second structure 22 pumps the fluid 72 through the at least one restriction orifice 86. The fluid-elastomeric damper assembly internal pumping mechanism 30 preferably includes a second fluid moving piston 80, with the second fluid moving piston 80 forcing the fluid 72 through a second pumping piston restriction orifice 86 between a third substantially fluid-filled variable volume chamber 32 and a fourth substantially-fluid-filled variable volume chamber 34 which are in fluid communication with the fluid-elastomeric chamber 40. The third fluid variable volume chamber 32 includes a third fluid backfiller 500, the third fluid backfiller 500 providing fluid communication of the fluid 72 from the fluid-elastomeric chamber 40 into the third fluid chamber 32 and inhibiting a flow of the fluid 72 from the third fluid chamber 32 into the fluid-elastomeric chamber 40. The fourth fluid variable volume chamber 34 includes a fourth fluid backfiller 500, the fourth fluid backfiller 500 providing fluid communication of the fluid 72 from the fluid-elastomeric chamber 40 into the fourth fluid chamber 34 and inhibiting a flow of the fluid 72 from the fourth fluid chamber 34 into the fluid-elastomeric chamber 40. The relative motion between the first structure 20 and the second structure 22 is operable for pumping the fluid 72 through the second restriction orifice 86.

Figure 21A:
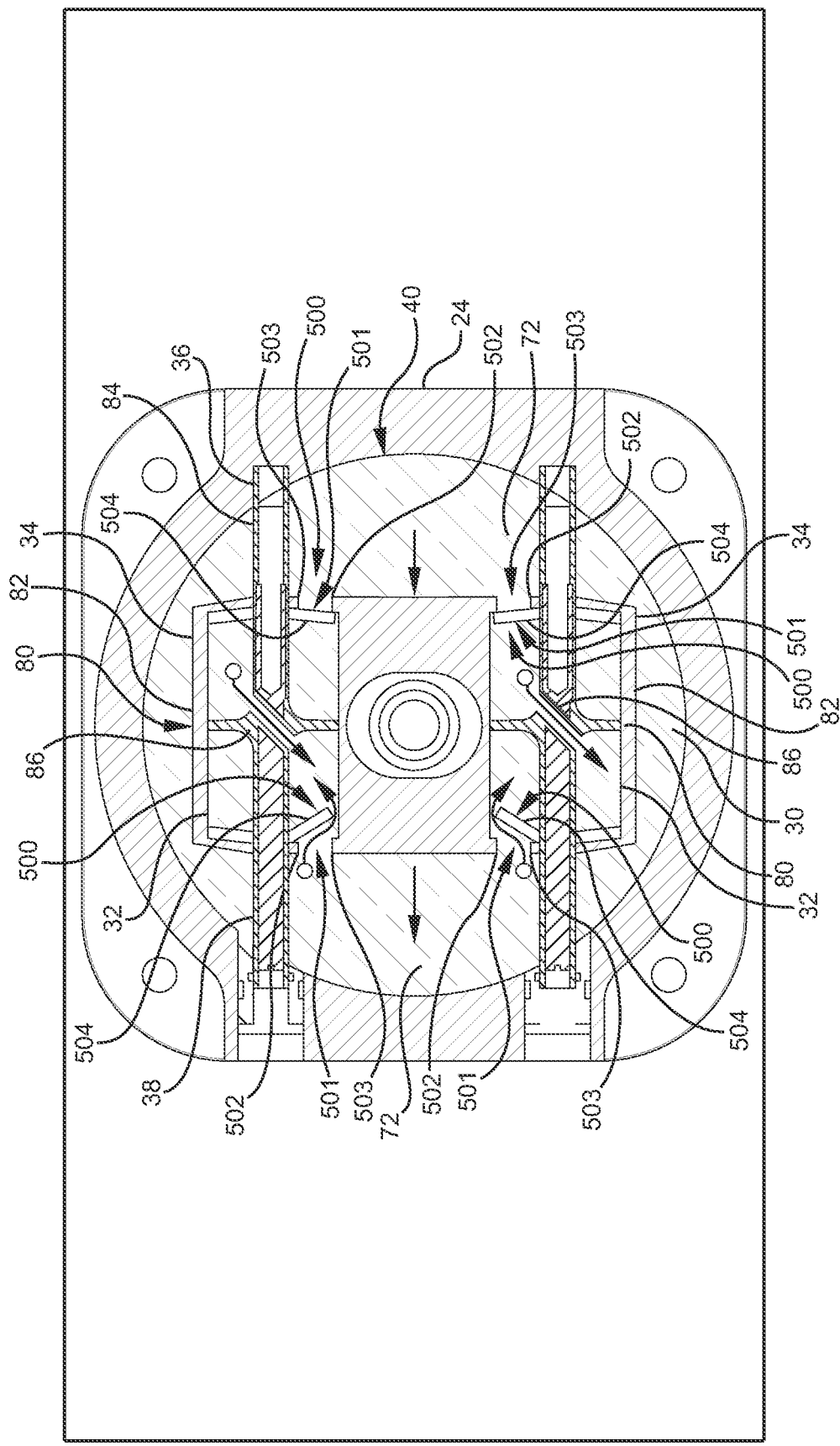
FIGS. 21A-D are cross-sectional top view of the fluid-elastomeric damper assembly such as shown in FIGS. 19-20, again highlighting the internal pumping device disposed within the fluid-elastomeric chamber of the fluid-elastomeric damper assembly.
Figure 21B:
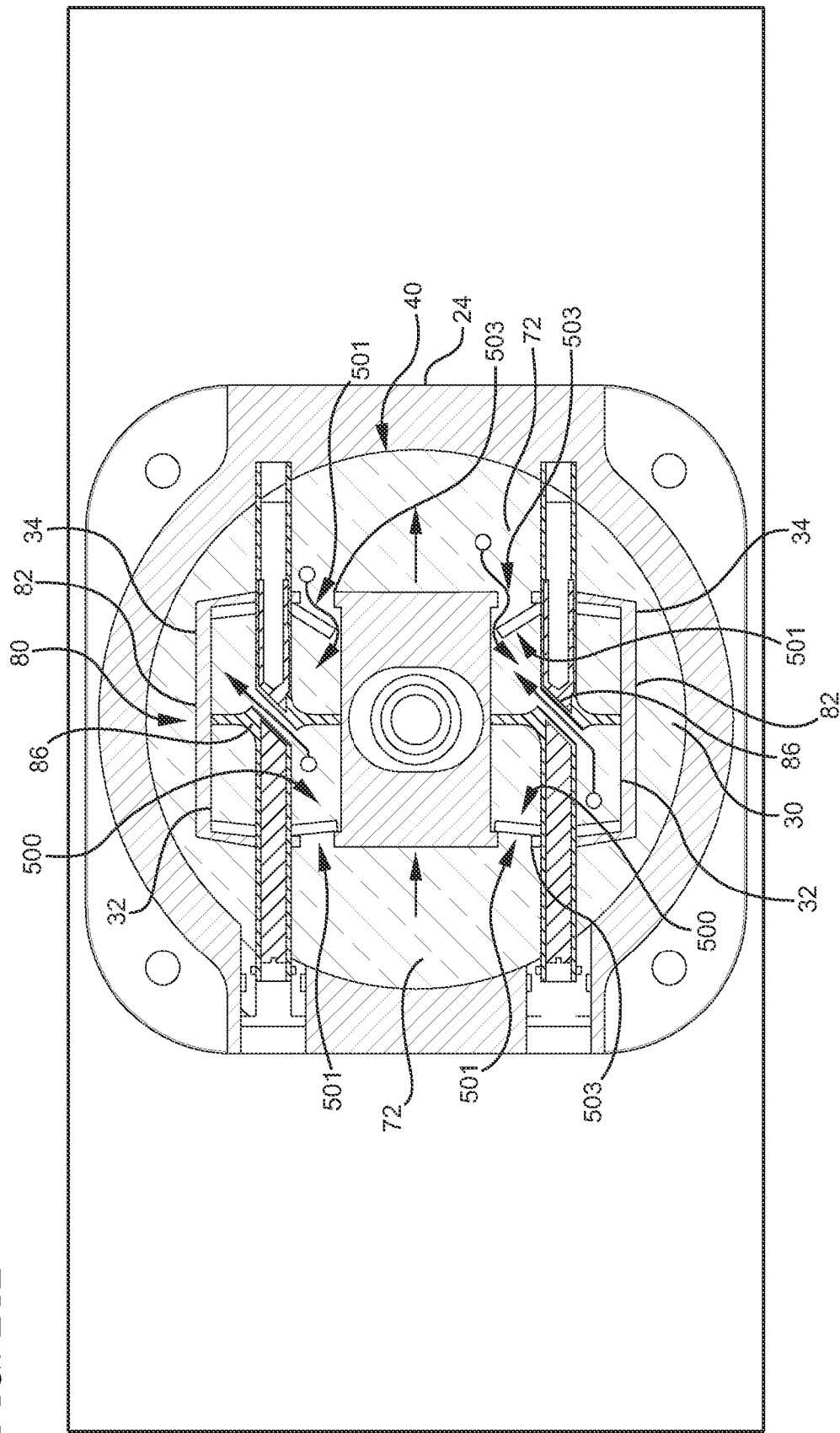

The fluid-elastomeric damper assembly backfiller 500 is comprised of a valve 501. The backfiller valve 501 is relatively closed and restricts fluid flow in the direction from the fluid variable volume chamber 32, 34 back into the surrounding fluid-elastomeric chamber 40 and relatively open with relatively low restriction of fluid flow in the opposite direction from the surrounding fluid-elastomeric chamber 40 into the fluid variable volume chamber when the volume of its variable volume chamber is increasing. Preferably the variable volume chamber backfiller 500 is comprised of a flow blocker spring plate 504, with the spring plate 504 allowing fluid flow into the fluid variable volume chamber 32, 34 when the volume of the variable volume chamber is increasing and the spring plate 504 closing and blocking fluid flow from the variable volume back into the fluid-elastomeric chamber 40 when the volume of the variable volume chamber is decreasing. As shown in FIG. 21A when the piston housing 82 of the internal fluid pumper 30 is moving to the left relative to the surrounding housing 24 and the fluid-elastomeric chamber 40 the first backfiller 500 opens and allows an inflow of fluid 72 into the first variable volume fluid chamber 32 when the volume of the first fluid chamber 32 is increasing at a high rate of change. The volume of the second variable volume fluid chamber 34 is decreasing from this internal fluid pumper 30 piston housing 82 moving to the left relative to the surrounding housing 24, with the fluid in the second fluid chamber 34 pumped through the orifice 86 into the first variable volume fluid chamber 32 with the second backfiller valve 501 closed. As shown in FIG. 21B when the internal pumper piston housing 82 moves to the right relative to the fluid-elastomeric chamber 40 and the surrounding housing 24, the first fluid chamber 32 first backfiller spring plate flapper valve 501 in the left side of the pumper piston housing 82 closes because the first fluid chamber 32 on this side is compressed against the piston 80 with the fluid forced through the orifice 86 in the piston. This causes an increase in pressure in this left side first variable volume fluid chamber 32 that seats the backfiller spring plate flapper valve 501 against the inside of the internal piston pumper housing closing the fluid communication opening 503. The fluid in the right side second variable volume fluid chamber 34 is uncompressed causing a decrease in pressure (to something less than the steady ambient pressure of the outside fluid-elastomeric chamber 40) which cause the backfill flapper valve 501 to unseat and open which allows fluid 72 from the outside fluid-elastomeric chamber 40 to backfill into this right side lower pressure second fluid chamber 34.

Figure 21C:
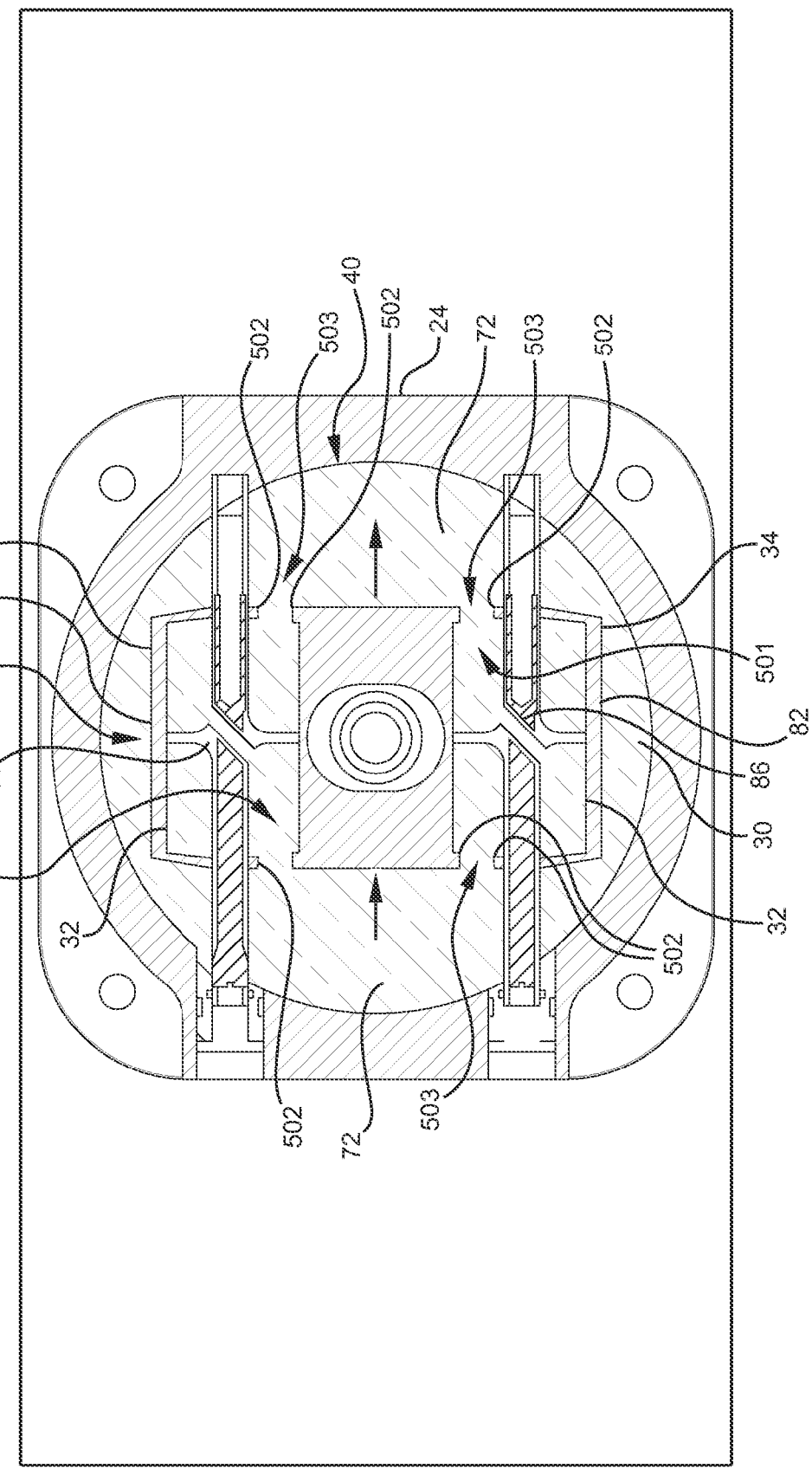
Figure 21D:
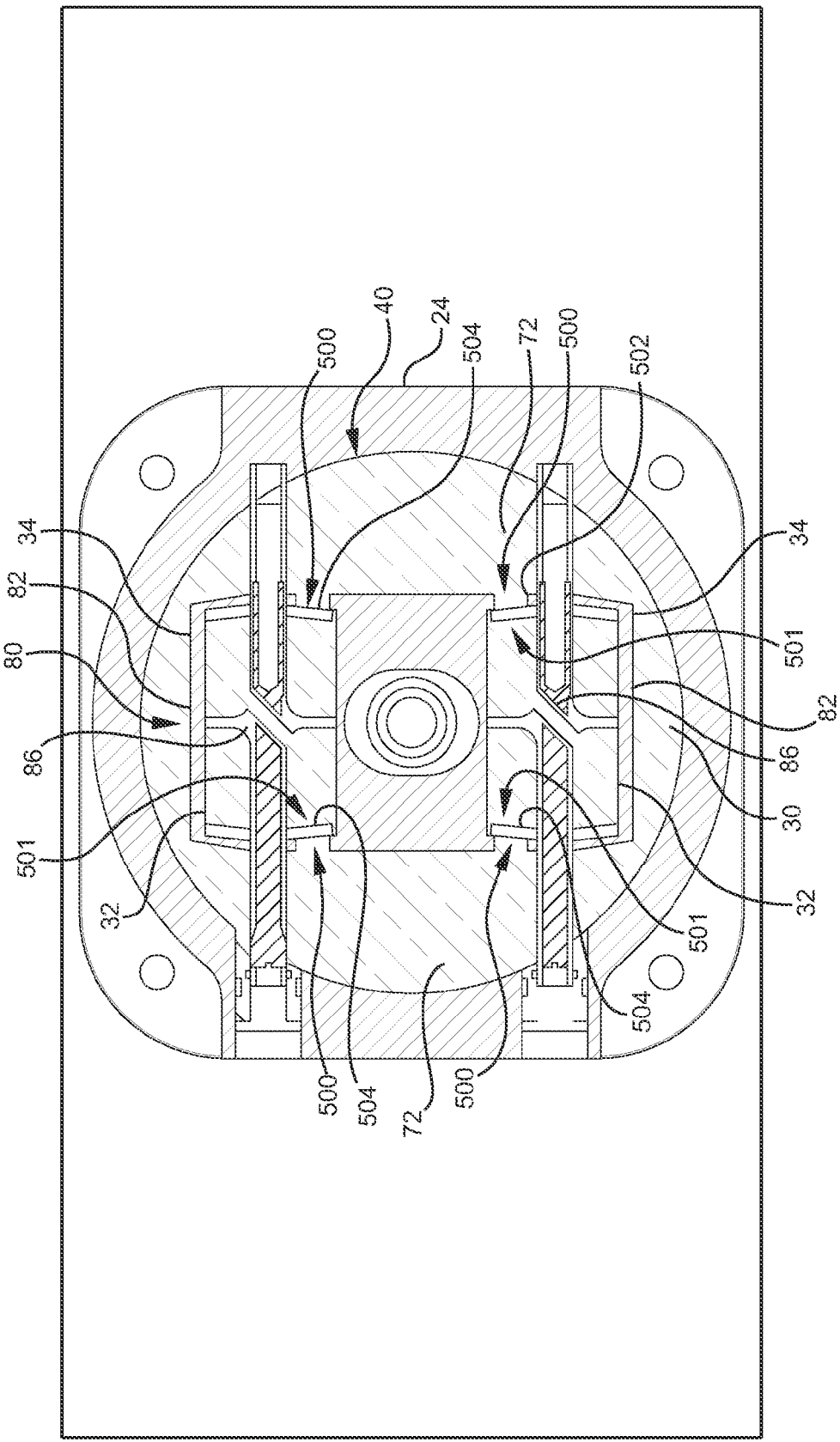

Preferably the first fluid chamber 32 is comprised of a first chamber housing wall 502 with the first chamber housing wall 502 segregating the first fluid chamber 32 from the fluid-elastomeric chamber 40. As shown in FIG. 21C the first fluid chamber housing wall 502 separates the fluid 72 inside the first fluid chamber 32 from the fluid 72 out in the fluid-elastomeric chamber 40, with the fluid chamber housing wall 502 having a fluid communication opening 503. In FIG. 21C no relative movement is shown, and the backfill flapper valves 501 are not shown to clearly illustrate the chamber housing walls 502 of the variable volume fluid chambers and the fluid backfiller communication openings 503 in the walls 502. FIG. 21D illustrates no relative movement as shown in FIG. 21C, but with the backfill flapper valves 501 blocking the fluid communication openings 503 in the walls 502. Preferably the fluid backfiller 500 is comprised of a flow blocker backfill spring plate 504, with the spring plate 504 adjacent the fluid communication opening 503 in the chamber housing wall 502 of its variable volume fluid chamber. Preferably the backfill flapper valve spring plate restricts flow in one direction and provides low restriction of fluid 72 in the opposite direction, with the spring plate 504 covering the wall opening 503 and obstructing, blocking, and plugging the flow of fluid 72 from inside its fluid chamber through the opening 503 in chamber wall 502 out into the fluid-elastomeric chamber 40. Preferably the spring plate backfiller 500 is pressure activated, with a fluid pressure drop in the variable volume fluid chamber the spring plate 504 deflects to an open position allowing an in flow of fluid 72 back into the increasing volume variable volume chamber from the fluid-elastomeric chamber 40 driven by the increasing volume pressure drop, such as a high amplitude displacement of the piston 80, the pressure drop from a first direction relative movement of the piston housing 82 relative to the housing 40 and orifice 86 along axially-extending piston structure rod 84 inside fluid-elastomeric chamber 40 opens the opening 503 and fluid 72 flows into the variable volume chamber so when the piston stroke pumping direction is reversed to the opposite direction with the volume of the variable volume chamber decreasing the variable volume chamber will be full of fluid 72, the opening 503 will then be closed by the backfiller plate 504 and the fluid 72 will then be forced through the restriction orifice 86, with the fluid flow through the pumping piston restriction orifice 86 dissipating the unwanted kinetic energy of the relative motion between the first structure 20 and the second structure 22. Preferably the backfiller plate 504 of the second fluid chamber 34 opens fluid flow into the second fluid chamber when the volume of the second fluid chamber 34 is increasing and the volume of the first fluid chamber 32 is decreasing with the backfiller plate 504 of the first fluid chamber 32 closed with the backfiller plate blocking fluid 72 from flowing through first fluid chamber wall opening 503 while the fluid 72 is forced from the second chamber 34 through the restriction orifice 86 into the first chamber 32.

Preferably the internal pumping mechanism fluid pump 30 includes a second fluid moving piston 80 with a piston housing 82 forming a third substantially fluid-filled chamber 32 and a fourth substantially-fluid-filled chamber 34 which are in fluid communication with the fluid-elastomeric chamber 40. The second fluid moving piston 80 forces the fluid 72 through a second pumping piston restriction orifice 86 between the third fluid chamber 32 and the fourth fluid chamber 34. The third variable volume chamber 32 includes a third fluid backfiller 500 providing fluid communication of the fluid 72 from the fluid-elastomeric chamber 40 into the third fluid chamber 32 and inhibiting a flow of the fluid 72 from the third fluid chamber 32 back into the fluid-elastomeric chamber 40. The fourth fluid chamber 34 includes a fourth fluid backfiller 500 providing fluid communication of the fluid 72 from the fluid-elastomeric chamber 40 into the fourth fluid chamber 34 and inhibiting a flow of the fluid 72 from the fourth fluid chamber 34 back into the fluid-elastomeric chamber 40 wherein the relative motion between the first structure 20 and the second structure 22 is operable for pumping the fluid through the second restriction orifice 86.

Preferably the damper assembly first fluid chamber housing wall 502 segregates the first fluid chamber 32 from the fluid-elastomeric chamber 40 by separating and segregating fluid 72 inside the first fluid chamber from the fluid out in the surrounding fluid-elastomeric chamber 40 with the first fluid backfiller 500 comprised of a valve 501 which provides liquid flow control through opening 503 in wall 502. The first chamber housing wall 502 defines the fluid communication opening 503 with the first fluid backfiller valve proximate the first chamber housing wall fluid communication opening 503. The second chamber housing wall 502 of the second fluid chamber 34 is preferably distal from the first chamber housing wall 502 of first chamber 32. The second chamber housing wall 502 segregates the second fluid chamber 34 from the surrounding outside fluid-elastomeric chamber 40, with the second chamber housing wall 502 defining a second fluid communication opening 503 and the second fluid backfiller 500 is comprised of a second valve 501 proximate this second chamber housing wall second fluid communication opening 503, wherein a relative motion of the internal pumping mechanism piston opens the first valve 501 and closes the second valve 501 with pumping of the internal pumping mechanism 30 in a first direction with the first fluid chamber 32 variable volume increasing and the second fluid chamber 34 variable volume decreasing. The third chamber housing wall 502 defines the fluid communication opening 503 with the third fluid backfiller valve 501 proximate the third chamber housing wall fluid communication opening 503. The fourth chamber housing wall 502 of the fourth fluid chamber 34 is preferably distal from the third chamber housing wall 502 of third chamber 32. The fourth chamber housing wall 502 segregates the fourth fluid chamber 34 from the surrounding outside fluid-elastomeric chamber 40, with the fourth chamber housing wall 502 defining a fourth fluid communication opening 503 and the fourth fluid backfiller 500 is comprised of a fourth valve 501 proximate this fourth chamber housing wall fourth fluid communication opening 503, wherein a relative motion of the internal pumping mechanism piston opens the third valve 501 and closes the fourth valve 501 with pumping of the internal pumping mechanism 30 in a first direction with the third fluid chamber 32 variable volume increasing and the fourth fluid chamber 34 variable volume decreasing. Preferably the motion of the first structure 20 relative to the second structure 22 pumps the internal pumping mechanism 30 with the first and third backfiller valves 501 opening to provide fluid flow in from the surrounding outside fluid-elastomeric chamber 40 while the second and fourth backfiller valves 501 close to inhibit fluid flow from the second and fourth chambers into the surrounding outside fluid-elastomeric chamber 40.

Preferably in operation of the fluid elastomeric damper assembly 10 with the damper internal fluid pump driven by the relative motion between the first structure 20 and the second structure 22 the damper fluid 72 outside the at least one fluid moving piston 80 and contained in the fluid-elastomeric chamber 40 has an operational ambient fluid pressure PA. The operational ambient fluid pressure PA is the pressure of fluid 72 outside the internal fluid pump but inside the damper fluid-elastomeric chamber 40 while the damper 10 is operating. The fluid 72 inside the at least one fluid moving piston variable volume chamber 32, 34 in which the variable volume is being decreased by the relative motion has an operational dynamic fluid pressure PD when pumped by the at least one fluid moving piston with PD≥1.01PA. Preferably the relative motion compresses the variable volume chamber and decreases the fluid volume at a high rate of change therein that provides for the increase in pressure of the fluid 72 to the operational dynamic fluid pressure PD with the backfiller valve 501 closed and the fluid forced through the restriction orifice 86 into the opposing variable volume chamber in which the variable volume is increasing. In operation the relative motion preferably drives the internal pumping mechanism 30 with the damper fluid pressurized in the variable volume chamber with PD−PA≥1PSI. In embodiments of the fluid elastomeric damper assembly PD≥1.05PA, preferably PD≥1.06PA, and more preferably PD≥1.07PA. In embodiments of the fluid elastomeric damper assembly PD−PA≥10PSI, preferably PD−PA≥100PSI, more preferably PD−PA≥500PSI. In embodiments of the fluid elastomeric damper assembly 10 preferably PD≥500PSI, such as about 873PSI, and about 1000PSI. In embodiments of the fluid elastomeric damper assembly 10 preferably PA≤100PSI, more preferably PA≤50PSI, such as about 15PSI.

The fluid elastomeric damper assembly 10 preferably operates with a broad range of fluid viscosities. Preferably the provided damper fluid 72 has a viscosity less than 5,000 centistokes, preferably a damper fluid with a viscosity in the range from 30 to 5000 centistokes. Preferably the damper fluid 72 has a viscosity less than 1,500 centistokes, preferably a viscosity in the range of 40 to 1200 centistokes, and more preferably 50 to 1000 centistokes. The backfiller damper assembly 10 preferably can utilize a broad range of viscosities, from relatively low at about 30 centistokes to relatively high at about 5000 centistokes.

Figure 22A:
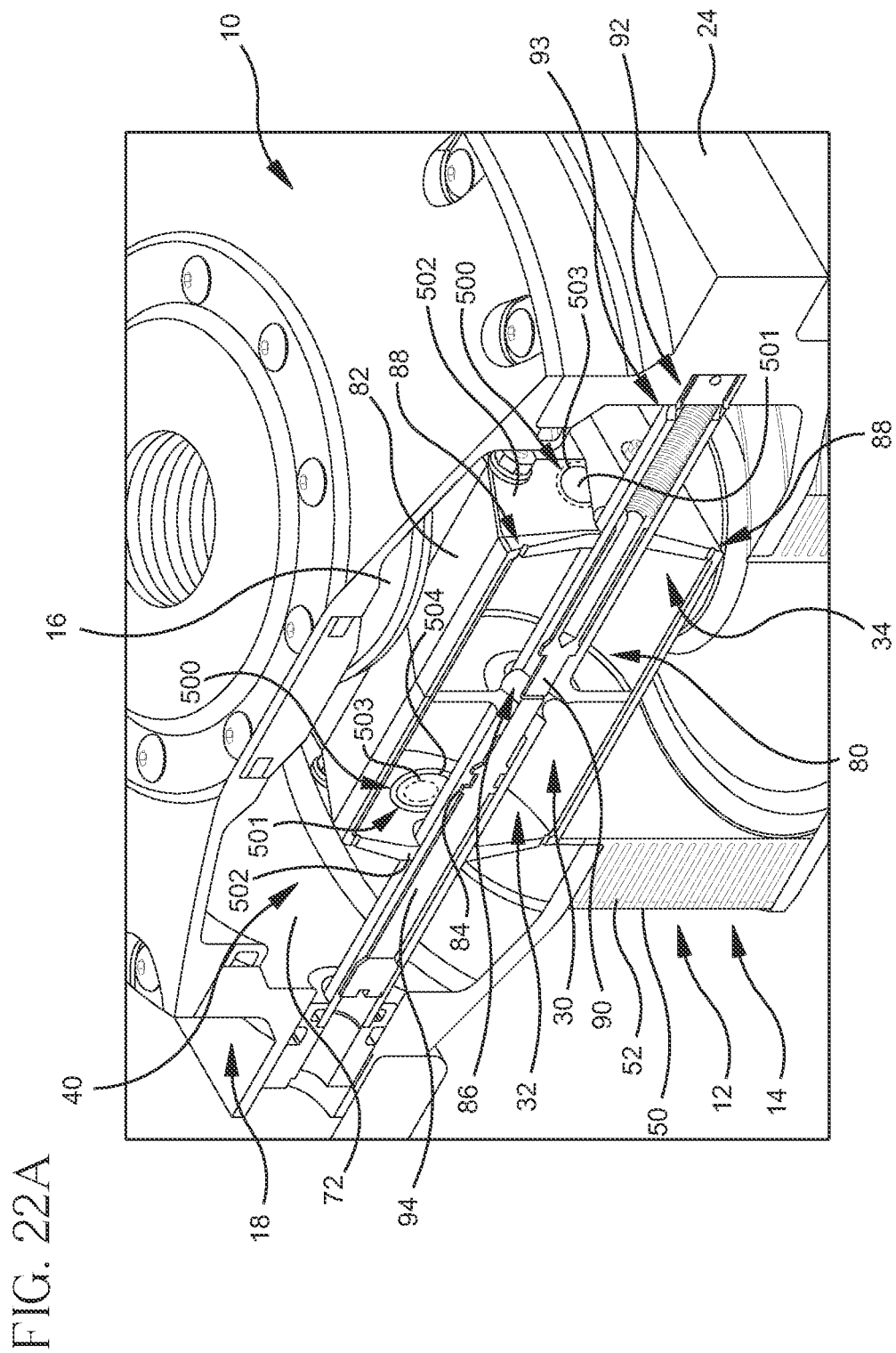
FIGS. 22A-B are exploded perspective views of the fluid-elastomeric damper assembly such as shown in FIGS. 19-20, again highlighting the internal pumping device disposed with the fluid-elastomeric chamber of the fluid-elastomeric damper assembly.
Figure 22B:
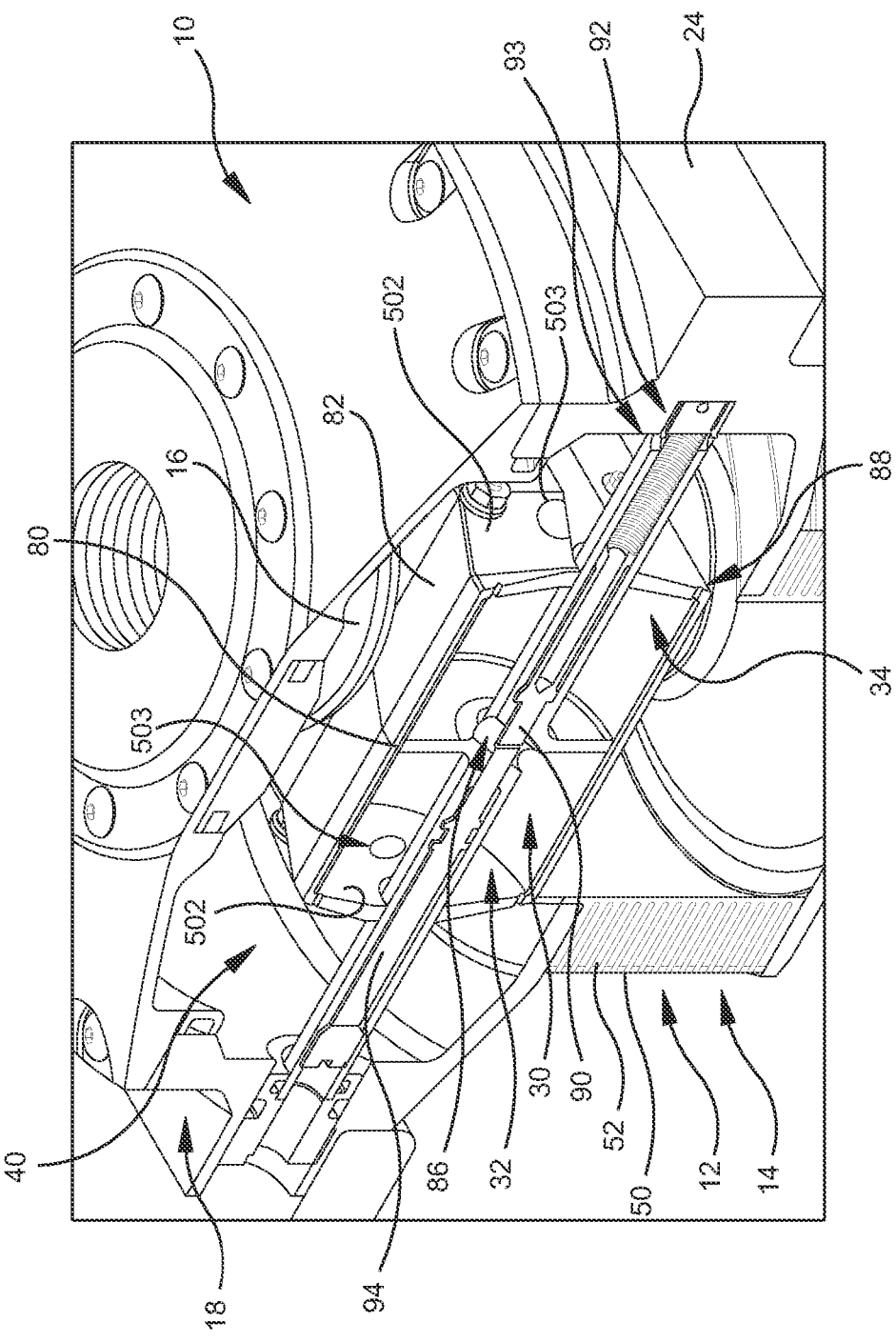
Figure 23A:
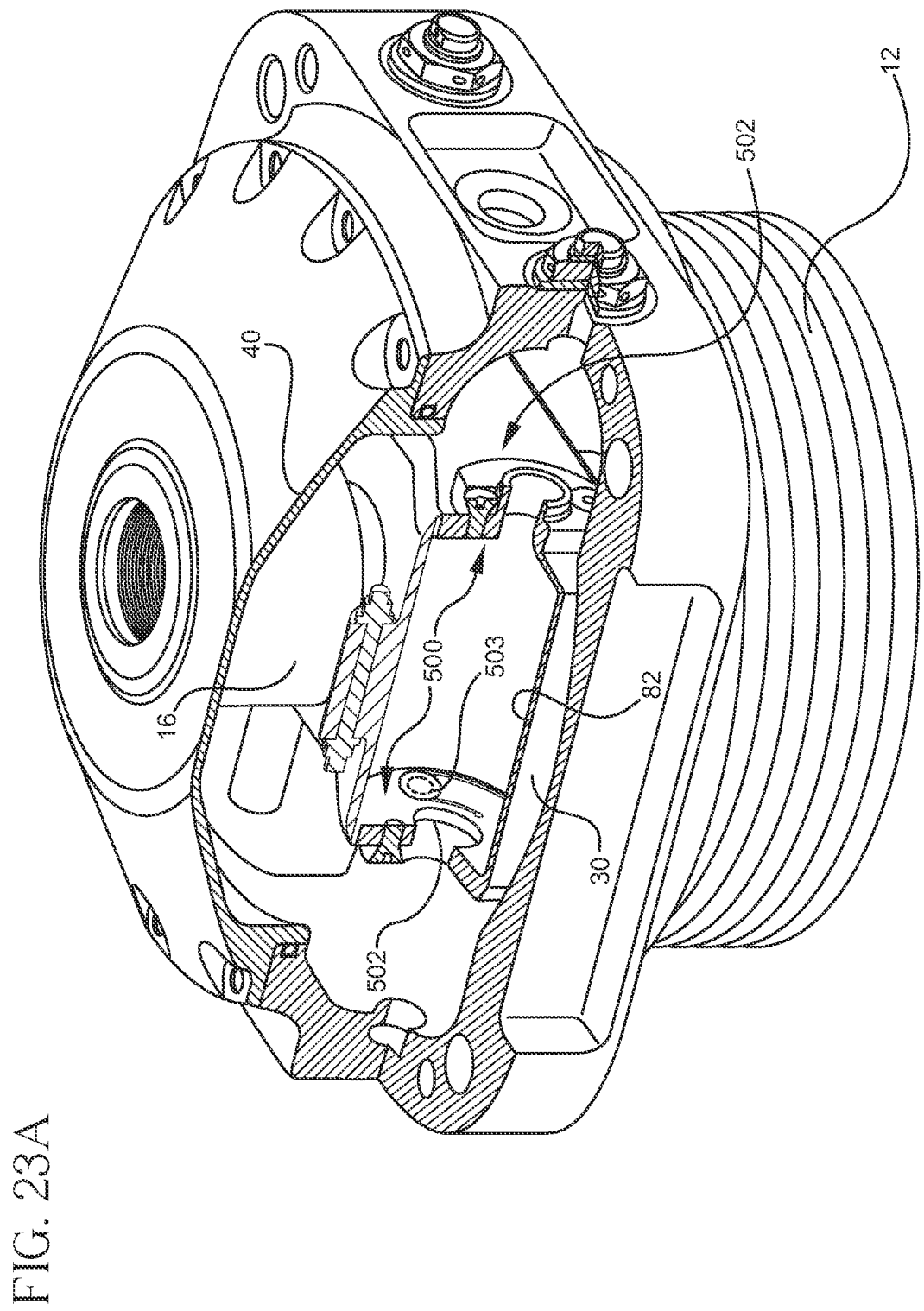
FIGS. 23A-B are cutaway perspective views of the fluid-elastomeric damper assembly highlighting the internal pumping device and the fluid backfillers.
Figure 23B:
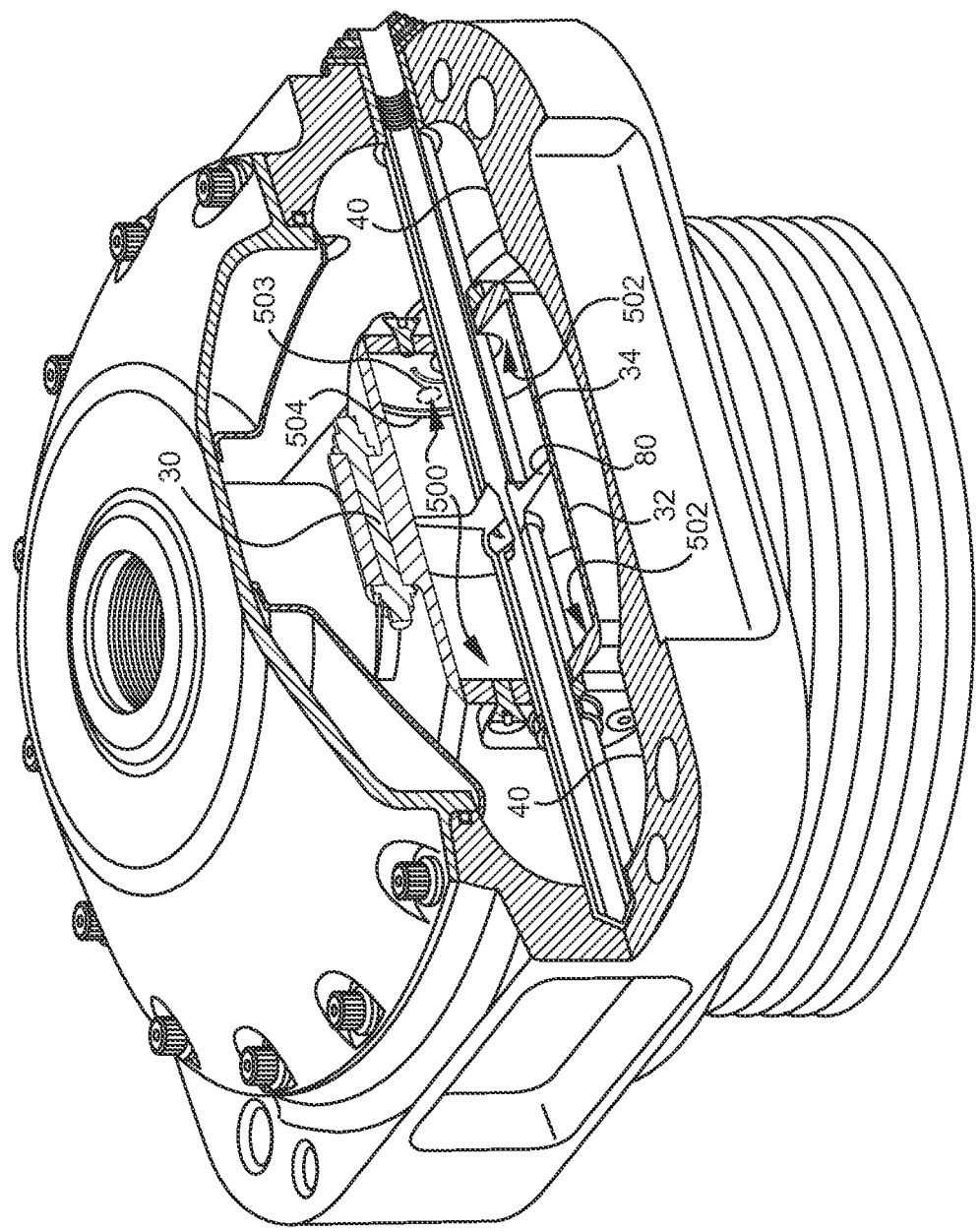
Figure 24:
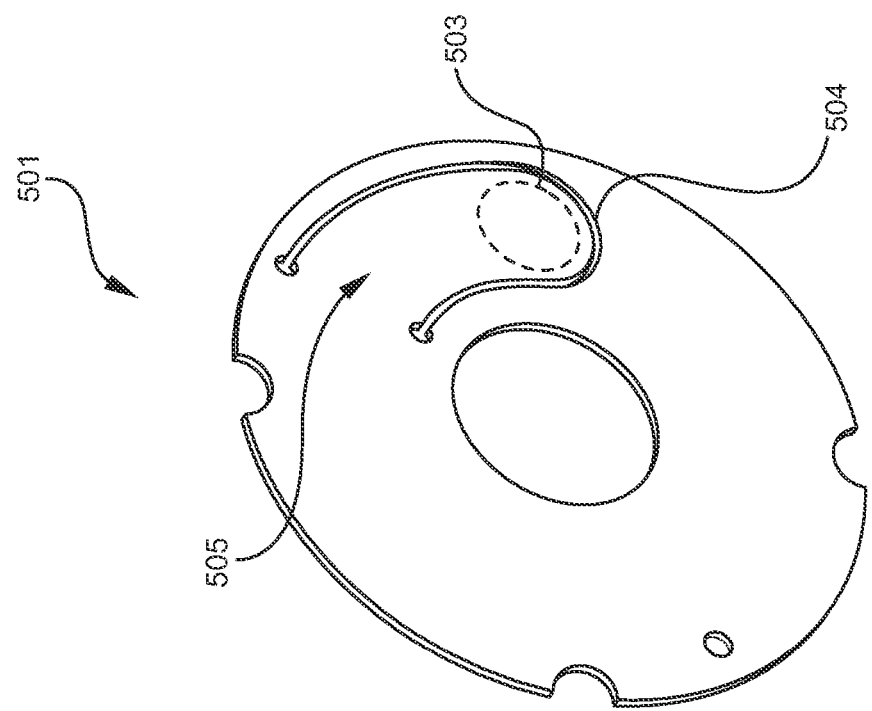
FIG. 24 shows a fluid backfiller spring plate valve.

FIG. 22A is an exploded perspective view of the fluid-elastomeric damper assembly 10 highlighting the internal pumping device 30 and the backfillers 500 of the first and second variable volume fluid chambers 32 and 34. FIG. 22B shows a similar view without the spring plate valves 504 in order to highlight the fluid communication openings 503 in the variable volume fluid chamber walls 502. Similarly FIG. 23A-B highlight the backfillers 500 with the spring plate valve 504 covering the fluid communication openings 503 in the fluid chamber walls 502. FIG. 24 shows an embodiment of a spring plate 504 which is utilized as a flow blocker flapper valve 501 to control the flow fluid through the fluid communication openings 503 in the chamber walls 502. Spring plate 504 is preferably made from a flexible sheet material such as stainless steel sheet metal with the spring plate flapper tongue 505 sized to cover and block the opening 503.

The invention includes a method for damping a relative motion between a first structure and a second structure. Preferably the method provides a beneficial means to damp a relative motion between a first structure 20 and a second structure 22. The method preferably includes providing a structure housing 24, with the structure housing 24 providing for a structural grounding to one of the structures 20, 22. The method preferably includes coupling a plurality of elastomeric seals 12, 16 to the housing 24, wherein the housing 24 and the plurality of elastomeric seals 12, 16 provide a fluid-elastomeric chamber 40 for containing a damper fluid 72. The method includes providing and disposing a damper fluid 72 within the fluid-elastomeric chamber 40. The method includes disposing an internal fluid pump 30, preferably with at least one fluid moving piston 80 enclosed in a piston housing 82, within the fluid-elastomeric chamber 40. The internal fluid pump 30 preferably comprises a first substantially fluid-filled variable volume chamber 32 and a second substantially fluid-filled variable volume chamber 34 in communication via at least one orifice 86. The first fluid chamber 32 preferably includes a first fluid backfiller 500 and the second fluid chamber 34 includes a second fluid backfiller 500. Preferably the first fluid chamber 32 and the second fluid chamber 34 are in communication with the fluid-elastomeric chamber 40, wherein the relative motion between the first structure 20 and the second structure 22 drives the at least one fluid moving piston 80 to pump the fluid 72 through the at least one orifice 86 with the first fluid backfiller 500 providing fluid communication of the fluid 72 from the fluid-elastomeric chamber 40 into the first fluid chamber 32 and inhibiting a flow of the fluid 72 from the first fluid chamber 32 back into the fluid-elastomeric chamber 40 and the second fluid backfiller 500 providing fluid communication of the fluid 72 from the fluid-elastomeric chamber 40 into the second fluid chamber 34 and inhibiting a flow of the fluid 72 from the second fluid chamber 34 back into the fluid-elastomeric chamber 40. The relative motion between the first structure and the second structure pumps the fluid 72 in the internal pumping mechanism 30 in a first direction with the first fluid chamber 32 variable volume increasing and the second fluid chamber 34 variable volume decreasing, and then pumping in a second opposite direction with the second fluid chamber 34 variable volume increasing and the first fluid chamber 32 variable volume decreasing. Preferably the first fluid backfiller 500 includes a first valve 501, and the second fluid backfiller 500 includes a second valve 501, wherein a relative movement of the piston 80 and the piston housing 82 opens the first valve 501 and closes the second valve 501.

Providing the internal pumping mechanism 30 preferably includes providing a second fluid moving piston 80, with the second fluid moving piston 80 forcing the fluid 72 through a second pumping piston restriction orifice 86 between a third substantially fluid-filled variable volume chamber 32 and a fourth substantially-fluid-filled variable volume chamber 34 which are in fluid communication with the fluid-elastomeric chamber 40. The third fluid variable volume chamber 32 preferably includes a third fluid backfiller 500, the third fluid backfiller 500 providing fluid communication of the fluid 72 from the fluid-elastomeric chamber 40 into the third fluid chamber 32 and inhibiting a flow of the fluid 72 from the third fluid chamber 32 into the fluid-elastomeric chamber 40. The fourth fluid variable volume chamber 34 preferably includes a fourth fluid backfiller 500, the fourth fluid backfiller 500 providing fluid communication of the fluid 72 from the fluid-elastomeric chamber 40 into the fourth fluid chamber 34 and inhibiting a flow of the fluid 72 from the fourth fluid chamber 34 into the fluid-elastomeric chamber 40. The relative motion between the first structure 20 and the second structure 22 pumps the fluid 72 through the second restriction orifice 86.

Providing the damper fluid 72 preferably includes providing a damper fluid with a viscosity less than 5,000 centistokes, preferably in the range from 30 to 5,000 centistokes. Preferably the damper fluid 72 has a viscosity less than 1,500 centistokes, preferably a viscosity in the range of 40 to 1200 centistokes, and more preferably 50 to 1000 centistokes.

Preferably in damping the relative motion between the first structure 20 and the second structure 22 the fluid 72 outside the internal pumping mechanism 30 and contained in the fluid-elastomeric chamber 40 has an operational ambient fluid pressure PA and the fluid 72 inside the internal pumping mechanism variable volume chamber which has the decreasing volume has an operational dynamic fluid pressure PD when pumped by the at least one fluid moving piston 80 with PD≥1.01PA. Preferably in operation the relative motion compresses the variable volume chamber and decreases the fluid volume at a high rate of change therein that provides for the increase in pressure of the fluid 72 to the operational dynamic fluid pressure PD with the backfiller valve 501 closed and the fluid forced through the restriction orifice 86 into the opposing variable volume chamber in which the variable volume is increasing. Preferably the relative motion drives the internal fluid pump 30 with the damper fluid 72 pressurized in the variable volume chamber with PD−PA≥1PSI. In embodiments preferably PD≥1.05PA, preferably PD≥1.06PA, and more preferably PD≥1.07PA. In embodiments preferably PD−PA≥10PSI, preferably PD−PA≥100PSI, more preferably PD−PA≥500PSI. In embodiments preferably PD≥500PSI, such as about 873PSI, and about 1000PSI. In embodiments preferably PA≤100PSI, more preferably PA≤50PSI, such as about 15PSI.

The invention preferably includes a method of making a rotary-wing aircraft fluid-elastomeric damper assembly 10 for damping a relative motion between a first structure 20 and a second structure 22 in a rotary-wing aircraft. The method includes coupling the elastomeric seals 12, 16 to the housing 24, wherein the housing 24 and the elastomeric seals 12, 16 provide the fluid-elastomeric chamber 40 for containing the damper fluid 72. The method includes disposing the internal fluid pump 30 with the first fluid variable volume chamber 32 and the second fluid variable volume chamber 34 within the fluid-elastomeric chamber 40. The method includes disposing the damper fluid 72 within the fluid-elastomeric chamber 40 wherein the internal fluid pump first variable volume chamber 32 and the second fluid variable volume chamber 34 are substantially filled with the fluid. The substantially fluid filled variable volume chambers are in communication via the at least one orifice 86, with the first fluid chamber 32 including the first fluid backfiller 500 and the second fluid chamber 34 including the second fluid backfiller 500. The first fluid chamber 32 and the second fluid chamber 34 are in communication with the fluid-elastomeric chamber 40, wherein the relative motion between the first structure 20 and the second structure 22 drives the fluid moving piston 80 of the pump 30 to pump the fluid 72 through the orifice 86 with the first fluid backfiller 500 providing fluid communication of the fluid 72 from the fluid-elastomeric chamber 40 into the first fluid chamber 32 and inhibiting a flow of the fluid 72 from the first fluid chamber 32 back into the fluid-elastomeric chamber 40 and the second fluid backfiller 500 providing fluid communication of the fluid 72 from the fluid-elastomeric chamber 40 into the second fluid chamber 34 and inhibiting a flow of the fluid 72 from the second fluid chamber 34 into the fluid-elastomeric chamber 40. Providing the internal fluid pump 30 preferably includes providing the second fluid moving piston 80, with the second fluid moving piston 80 forcing the fluid 72 through the second pumping piston restriction orifice 86 between the third substantially fluid-filled variable volume chamber 32 and the fourth substantially-fluid-filled variable volume chamber 34 which are in fluid communication with the fluid-elastomeric chamber 40. The third fluid variable volume chamber 32 preferably includes the third fluid backfiller 500, the third fluid backfiller 500 providing fluid communication of the fluid 72 from the fluid-elastomeric chamber 40 into the third fluid chamber 32 and inhibiting the flow of the fluid 72 from the third fluid chamber 32 into the fluid-elastomeric chamber 40. The fourth fluid variable volume chamber 34 preferably includes the fourth fluid backfiller 500, the fourth fluid backfiller 500 providing fluid communication of the fluid 72 from the fluid-elastomeric chamber 40 into the fourth fluid chamber 34 and inhibiting the flow of the fluid 72 from the fourth fluid chamber 34 into the fluid-elastomeric chamber 40. The relative motion between the first structure 20 and the second structure 22 pumps the fluid 72 through the second restriction orifice 86. Preferably the provided damper fluid 72 has a viscosity less than 5,000 centistokes, preferably a viscosity in the range from 30 to 5000 centistokes. Preferably the damper fluid 72 has a viscosity less than 1,500 centistokes, preferably a viscosity in the range of 40 to 1200 centistokes, and more preferably 50 to 1000 centistokes. The backfiller damper assembly utilizes a broad range of viscosities, from relatively low at about 30 centistokes to relatively high at about 5000 centistokes. Preferably the damper fluid 72 outside the internal fluid pump 30 and contained in the fluid-elastomeric chamber 40 has an operational ambient fluid pressure PA. The operational ambient fluid pressure PA is the pressure of fluid 72 outside the internal fluid pump but inside the damper fluid-elastomeric chamber 40 while the damper 10 is operating. The fluid 72 inside the variable volume chamber 32, 34 in which the variable volume is being decreased by the relative motion has an operational dynamic fluid pressure PD when pumped by the at least one fluid moving piston with $PD \geq 1.01 PA$. Preferably the relative motion compresses the variable volume chamber and decreases the fluid volume at a high rate of change therein that provides for the increase in pressure of the fluid 72 to the operational dynamic fluid pressure PD with the backfiller valve 501 closed and the fluid forced through the restriction orifice 86 into the opposing variable volume chamber in which the variable volume is increasing. In operation the relative motion preferably drives the internal pumping mechanism 30 with the damper fluid pressurized in the variable volume chamber with $PD-PA \geq 1 PSI$. In embodiments of the fluid elastomeric damper assembly $PD \geq 1.05 PA$, preferably $PD \geq 1.06 PA$, and more preferably $PD \geq 1.07 PA$. In embodiments of the fluid elastomeric damper assembly $PD-PA \geq 10 PSI$, preferably $PD-PA \geq 100 PSI$, more preferably $PD-PA \geq 500 PSI$. In embodiments of the fluid elastomeric damper assembly preferably $PD \geq 500 PSI$, such as about 873PSI, and about 1000PSI. In embodiments of the fluid elastomeric damper assembly preferably $PA \leq 100 PSI$, more preferably $PA \leq 50 PSI$, such as about 15PSI.

The invention preferably includes a method for damping relative motion between a first structure 20 and a second structure 22. The method includes grounding the housing structure 24 to the first structure 20. The method includes coupling the elastomer seals 12, 16 to the housing structure 24, wherein the housing structure 24 and the elastomer seals define the fluid-elastomeric chamber 40. The method includes providing and disposing the damper fluid 72 within the fluid-elastomeric chamber 40. The method includes providing and disposing a internal piston pump 30 within the housing structure 24 and the fluid-elastomeric chamber 40, wherein the piston pump 30 comprises the first substantially fluid-filled variable volume chamber 32 and the second substantially fluid-filled variable volume chamber 34 in communication via the orifice 86, with the first fluid-filled chamber 32 and the second fluid-filled chamber 34 also in communication with the fluid-elastomeric chamber 40. The piston pump 30 preferably is comprised of a piston 80 enclosed by a piston housing 82. The relative motion between the first structure 20 and the second structure 22 drives the piston pump 30 and pumps the fluid 72 through the orifice 86, with the fluid 72 outside the piston pump 30 and contained in the fluid-elastomeric chamber 40 having an operational ambient fluid pressure PA, and the fluid 72 inside the piston pump 30 having an operational dynamic fluid pressure PD when pumped by the piston pump with $PD \geq 1.01 PA$. In operation the relative motion preferably drives the internal pump 30 with the damper fluid 72 pressurized in the variable volume chamber in which the volume is being reduced with $PD-PA \geq 1 PSI$. In embodiments the internal pump 30 is driven by the relative motion with the operational dynamic fluid pressure $PD \geq 1.05 PA$, preferably $PD \geq 1.06 PA$, and more preferably $PD \geq 1.07 PA$. In embodiments the internal pump 30 is driven by the relative motion with $PD-PA \geq 10 PSI$, preferably $PD-PA \geq 100 PSI$, more preferably $PD-PA \geq 500 PSI$. In embodiments the internal pump 30 is driven by the relative motion with the operational dynamic fluid pressure $PD \geq 500 PSI$, such as about 873PSI, and about 1000PSI. In embodiments $PA \leq 100 PSI$, more preferably $PA \leq 50 PSI$, such as about 15PSI. Preferably the first substantially fluid-filled chamber 32 includes the first fluid backfiller 500 and the second substantially fluid-filled chamber 34 includes the second fluid backfiller 500, wherein the relative motion between the first structure and the second structure drives the fluid 72 through the orifice 86 with the first fluid backfiller 500 providing fluid communication of the fluid 72 from the fluid-elastomeric chamber 40 into the first fluid chamber 32 and inhibiting a flow of the fluid 72 from the first fluid chamber 32 into the fluid-elastomeric chamber 40 and the second fluid backfiller 500 providing fluid communication of the fluid 72 from the fluid-elastomeric chamber 40 into the second fluid chamber 34 and inhibiting a flow of the fluid 72 from the second fluid chamber 34 into the fluid-elastomeric chamber 40. Preferably the relative motion compresses the variable volume chamber and decreases the fluid volume at a high rate of change therein that provides for the increase in pressure of the fluid 72 to the operational dynamic fluid pressure PD, preferably with the backfiller valve 501 closed and the fluid forced through the restriction orifice 86 into the opposing variable volume chamber in which the variable volume is increasing.

It is apparent that there has been provided, in accordance with the assemblies, mechanisms, and methods of the present invention, a fluid-elastomeric damper assembly including an internal pumping mechanism. Although the assemblies, mechanisms, and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A fluid-elastomeric damper including: a nonelastomeric housing; at least a first nondynamic elastomer seal coupled to the housing with the housing and the at least first nondynamic elastomer seal providing an outer fluid-elastomeric chamber containing a damper fluid for submerging an internal pumping mechanism with said outer fluid-elastomeric chamber and said fluid-elastomeric damper containing said damper fluid without a dynamic seal, said internal pumping mechanism disposed within the fluid-elastomeric chamber, with said housing coupled to a first structure, said first elastomer seal coupled to a second structure, said second structure movable relative to said first structure, said internal pumping mechanism including a piston structure housing coupled to the second structure and a piston structure disposed within the piston structure housing wherein said piston structure housing comprises a first damper fluid-filled chamber and a second damper fluid-filled chamber, the first damper fluid-filled chamber and the second damper fluid-filled chamber in communication via a damper fluid restriction with said first damper fluid-filled chamber and said second damper fluid-filled chamber isolated from said at least first non-dynamic elastomer seal.

2. The damper of claim 1, wherein said at least first elastomer seal coupled to the housing is comprised of an elastomer fixedly attached to a housing structure.

3. The damper of claim 1, wherein said at least first elastomer seal coupled to the housing is comprised of an elastomer bonded to a housing member.

4. The damper of claim 1, wherein said damper fluid restriction is comprised of an orifice with a nonadjustable restriction size.

5. The damper of claim 1, wherein said damper fluid has a viscosity less than 5,000 centistokes.

6. The damper of claim 1, wherein said damper fluid has a viscosity in the range from 30 to 5000 centistokes.

7. The damper of claim 1, wherein said damper fluid has a viscosity in the range from 50 to 1000 centistokes.

8. The damper of claim 1, wherein said damper fluid has a viscosity in the range from 40 to 1200 centistokes.

9. The damper of claim 1, wherein said damper fluid has a viscosity less than 1,500 centistokes.

10. The damper of claim 1, wherein the damper fluid outside the internal pumping mechanism and contained in the outer fluid-elastomeric chamber has an operational ambient fluid pressure PA and the damper fluid inside the internal pumping mechanism has an operational dynamic fluid pressure PD when pumped with PD≥1.01 PA.

11. The damper of claim 10, wherein PA≤100PSI.

12. The damper of claim 10, wherein PA≤50PSI.

13. The damper of claim 10, wherein PD≥500PSI.

14. The damper of claim 1, wherein the damper fluid outside the internal pumping mechanism and contained in the outer fluid-elastomeric chamber has an operational ambient fluid pressure PA and the damper fluid inside the internal pumping mechanism has an operational dynamic fluid pressure PD when pumped with PD−PA≥10PSI.

15. The damper of claim 14, wherein PD−PA≥100PSI.

16. The damper of claim 14, wherein PD≥500PSI.

17. The damper of claim 14, wherein PA≤100PSI.

18. The damper of claim 14, wherein PA≤50PSI.

19. A method for damping relative motion between a first structure and a second structure, the method comprising: providing a housing; coupling at least a first nondynamic elastomer seal to the housing to provide an outer ambient fluid-elastomeric chamber with said first nondynamic elastomer seal providing for said motion between said first structure and said second structure; disposing at least a first internal pumping piston structure within the outer ambient fluid-elastomeric chamber, disposing a damper fluid within the fluid-elastomeric chamber, said at least first internal pumping piston structure comprises a first damper fluid-filled chamber and a second damper fluid-filled chamber in communication via a damper fluid restriction, the first fluid-filled chamber and the second fluid-filled chamber also in communication with the outer ambient fluid-elastomeric chamber to provide a fluid-elastomeric damper with said outer fluid-elastomeric chamber and said fluid-elastomeric damper containing said damper fluid without a dynamic seal, wherein relative motion between said first structure and said second structure pumps the damper fluid through the damper fluid restriction with an operational dynamic fluid pressure and the damper fluid outside the internal pumping piston structure and contained in the outer fluid-elastomeric chamber has a lower operational ambient fluid pressure.

20. The method of claim 19, wherein said damper fluid has a viscosity less than 5,000 centistokes.

21. The method of claim 19, wherein said damper fluid has a viscosity in the range from 30 to 5000 centistokes.

22. The method of claim 21, wherein said damper fluid has a viscosity in the range from 50 to 1000 centistokes.

23. The method of claim 19, wherein said damper fluid has a viscosity in the range from 40 to 1200 centistokes.

24. The method of claim 19, wherein said damper fluid has a viscosity less than 1,500 centistokes.

25. The method of claim 19, wherein coupling at least a first nondynamic elastomer seal to the housing comprises fixedly attaching said at least first nondynamic elastomer seal to said housing.

26. The method of claim 19, wherein coupling at least a first nondynamic elastomer seal to the housing comprises bonding said at least first nondynamic elastomer seal to said housing.

27. The method of claim 19, wherein said nondynamic elastomer seals are nondynamic bonded elastomeric seals.

28. The method of claim 19, wherein said damper fluid restriction is comprised of an orifice with a nonadjustable restriction size.

29. The method of claim 19, wherein the damper fluid outside the internal pumping mechanism and contained in the outer fluid-elastomeric chamber has an operational ambient fluid pressure PA and the damper fluid inside the internal pumping mechanism has an operational dynamic fluid pressure PD with PD≥1.01 PA.

30. The method of claim 29, wherein PA≤100PSI.

31. The method of claim 29, wherein PA≤50PSI.

32. The method of claim 29, wherein PD≥500PSI.

33. The method of claim 19, wherein the damper fluid outside the internal pumping mechanism and contained in the outer fluid-elastomeric chamber has an operational ambient fluid pressure PA and the damper fluid inside the internal pumping mechanism has an operational dynamic fluid pressure PD when pumped with PD−PA≥10PSI.

34. The method of claim 33, wherein PD−PA≥100PSI.

35. The method of claim 33, wherein PD≥500PSI.

36. The method of claim 33, wherein PA≤100PSI.

37. The method of claim 33, wherein PA≤50PSI.

* * * * *